(12) United States Patent
Askerdal et al.

(10) Patent No.: US 10,106,144 B2
(45) Date of Patent: Oct. 23, 2018

(54) VEHICLE COMPRISING A VEHICLE SYSTEM CONTROLLER FOR CONTROLLING ENERGY FLOWS WITHIN THE VEHICLE

(71) Applicant: VOLVO TRUCK CORPORATION, Göteborg (SE)

(72) Inventors: Mikael Askerdal, Frillsesås (SE); Mattias Åsbogård, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 286 days.

(21) Appl. No.: 15/106,195

(22) PCT Filed: Dec. 19, 2014

(86) PCT No.: PCT/SE2014/000153
§ 371 (c)(1),
(2) Date: Jun. 17, 2016

(87) PCT Pub. No.: WO2015/094077
PCT Pub. Date: Jun. 25, 2015

(65) Prior Publication Data
US 2016/0325729 A1    Nov. 10, 2016

Related U.S. Application Data

(63) Continuation-in-part of application No. PCT/EP2013/003891, filed on Dec. 20, 2013.

(30) Foreign Application Priority Data

Dec. 20, 2013  (WO) .................. PCT/EP2013/003891

(51) Int. Cl.
*B60W 20/15*    (2016.01)
*B60W 20/00*    (2016.01)
(Continued)

(52) U.S. Cl.
CPC .............. *B60W 20/15* (2016.01); *B60L 1/00* (2013.01); *B60L 11/02* (2013.01); *B60L 11/16* (2013.01);
(Continued)

(58) Field of Classification Search
CPC ...... B60W 20/15; B60W 10/30; B60W 20/00; B60L 1/00; B60L 11/16; B60L 11/02;
(Continued)

(56) References Cited

U.S. PATENT DOCUMENTS

| 5,820,172 A | 10/1998 | Brigham et al. |
| 2004/0074682 A1 | 4/2004 | Fussey et al. |

(Continued)

FOREIGN PATENT DOCUMENTS

| DE | 102005044268 A1 | 3/2007 |
| DE | 102007008398 A1 | 7/2008 |

(Continued)

OTHER PUBLICATIONS

International Search Report (dated Apr. 29, 2015) for corresponding International App. PCT/SE2014/000153.
(Continued)

*Primary Examiner* — Daniel Cavallari
(74) *Attorney, Agent, or Firm* — WRB-IP LLP

(57) ABSTRACT

A vehicle system controller is configured to determine a current buffer ratio for a first energy buffer based on a current buffer energy level for the first energy buffer and a predetermined buffer range for the first energy buffer, and determine if the current buffer ratio for the first energy buffer should be increased using energy provided by a power converter, the determination being based on the current buffer ratio for the first energy buffer and a cost for generating energy from energy stored in a second energy buffer using the power converter.

12 Claims, 10 Drawing Sheets

(51) Int. Cl.
  *G06Q 10/04* (2012.01)
  *B60L 1/00* (2006.01)
  *B60L 11/02* (2006.01)
  *B60L 11/16* (2006.01)
  *B60W 10/30* (2006.01)

(52) U.S. Cl.
  CPC ............ *B60W 10/30* (2013.01); *B60W 20/00* (2013.01); *G06Q 10/04* (2013.01); *B60L 2210/00* (2013.01); *B60Y 2400/20* (2013.01); *Y02T 10/84* (2013.01); *Y10S 903/904* (2013.01)

(58) Field of Classification Search
  CPC ..... B60L 2210/00; G06Q 10/04; Y02T 10/84; Y10S 903/904; B60Y 2400/20
  See application file for complete search history.

(56) References Cited

U.S. PATENT DOCUMENTS

| | | |
|---|---|---|
| 2008/0011005 A1 | 1/2008 | Obayashi et al. |
| 2008/0097664 A1 | 4/2008 | Aoyama et al. |
| 2009/0118085 A1* | 5/2009 | Heap .................... B60K 6/365 477/5 |
| 2010/0102625 A1 | 4/2010 | Karimi et al. |
| 2010/0312425 A1 | 12/2010 | Obayash et al. |
| 2013/0325214 A1 | 12/2013 | Vos |
| 2015/0051776 A1* | 2/2015 | Gotoh .................. B60W 20/15 701/22 |

FOREIGN PATENT DOCUMENTS

| | | |
|---|---|---|
| DE | 102008007119 A1 | 8/2009 |
| DE | 102008063954 A1 | 7/2010 |
| JP | 2006339165 A | 12/2006 |
| WO | 2012155927 A1 | 11/2012 |

OTHER PUBLICATIONS

International Preliminary Report on Patentability (dated Mar. 10, 2016) for corresponding International App. PCT/SE2014/000153.
Japanese Official Action (dated Aug. 17, 2018) for corresponding Japanese App. 2016-541170.

* cited by examiner

VEHICLE COMPRISING A VEHICLE SYSTEM CONTROLLER FOR CONTROLLING ENERGY FLOWS WITHIN THE VEHICLE

BACKGROUND AND SUMMARY

The present invention relates to the field of managing energy flows between energy buffers of a vehicle.

Due to increasingly stringent legislation and an increasing interest from the market fuel efficiency has been one of the main drivers for passenger cars for many years now. However, today fuel efficiency is one of the main drivers not only for passenger cars, but also for heavy duty vehicles and other commercial vehicles. The combustion engine and the powertrain has been refined for many years, and it is becoming more and more difficult to make large improvements in order to improve the fuel efficiency. Instead all aspects of the engine, the powertrain and the control functionalities have to be considered. All small improvements, especially if the improvement can be achieved without adding substantial cost, are important and worth to pursue.

One possible approach for improving the fuel efficiency is by optimizing the energy management of the energy system of a vehicle such that no more power than what is required at a certain time is produced, that the available total amount of power at a certain time is distributed in the energy system in the most efficient way and that the available total amount of power is used in the best possible way. How much power that needs to be produced, where in the energy system and how this power should be consumed is however far from trivial to determine. The different energy producers and consumers of an energy system are affecting one another and therefore cannot be done independently. Also, the circumstances during which the optimization is to be performed are changing continuously. This makes the tuning process time consuming and complex, and since it is directly dependent on the present setup it needs to be redone at the slightest change of the setup.

One possible approach to control the energy system of a vehicle is by using standard optimal control, in which a cost function is set and subsequently optimized. However, setting up such cost function for the energy system of a vehicle and subsequently solving the optimization problem is far from easy. Another possible approach is to use distributed optimization, but distributed optimization includes a non-trivial negotiation phase. It is also possible to use a limited step controller, but this approach is best suited for less complex systems. For more complicated systems the tuning of such system will be quite complex.

WO 2012155927, hereby considered to be incorporated by reference, discloses an energy management system of a vehicle wherein activation agents control the energy flows within the vehicle. Said activation agents control main systems and auxiliary systems of the vehicle by adapting pricing rules. The energy is traded between the energy main systems and the auxiliary systems. The price of energy is variably dependent on the momentary supply of energy for the vehicle. Each main system has a price at which it will provide energy and each auxiliary system has an individual price limit up to which the auxiliary system will purchase energy. Above this individual price limit the auxiliary system will not purchase any energy. Some auxiliary systems have variable individual price limits and some auxiliary systems have fixed individual price limit. The price of energy is dependent on the amount of available energy, and based on the individual price limits of respective auxiliary system the activation agents of said main systems and auxiliary systems decides whether respective system should be activated or not. However, WO 2012155927 only states in which direction energy should be transferred and not how much and how fast energy should be transferred.

Thus, there is a need for further improvements.

It is desirable to provide improvements in control of how energy is allowed to flow between different energy buffers comprised with a vehicle possibly allowing for reduction in fuel consumption of the vehicle. According to an aspect of the invention, a vehicle is provided comprising a first and a second energy buffer, a power converter that is operationally connected to the first and the second energy buffer, and a specifically adapted vehicle system controller configured. According to another aspect of the invention, a method is provided for controlling the conversion of energy between different energy forms. This is done by energy converters, enabling that energy can be provided in at least one direction between the different energy subsystems, of said energy system.

According to an aspect of the invention there is provided a vehicle, the vehicle comprising a first energy buffer, the first energy buffer having a buffer energy level that can increase or decrease based on the operation of the vehicle, a second energy buffer, the second energy buffer having a buffer energy level that can increase or decrease based on the operation of the vehicle, a power converter operationally connected to the first and the second energy buffer, and a vehicle system controller, the vehicle system controller being configured to determine a current buffer ratio for the first energy buffer based on a current buffer energy level for the first energy buffer and a predetermined buffer range for the first energy buffer, and determine if the current buffer ratio for the first energy buffer should be increased using energy provided by the power converter, the determination being based on the current buffer ratio for the first energy buffer and a cost for generating energy from energy stored in the second energy buffer using the power converter.

The inventive concept is intended to be implemented to control energy flows of a vehicle comprising an energy system, wherein the energy system comprises a plurality of energy subsystems. Every energy subsystem uses one specific form of energy, such as e.g. mechanical energy, electrical energy, pneumatic energy or thermal energy. For every energy subsystem an energy market for respective form of energy is formed in which energy can be distributed between the different engine components of said energy subsystem. Some energy subsystems may use the same form of energy but in different utilization forms, such e.g. AC or DC, or different effect levels, of electrical energy for an electrical energy subsystem. In this context different effect levels of the same energy form is considered as different energy forms. To give an example; a transformer is generally used for converting high voltage to lower voltage.

According to the inventive concept a transformer can be considered to be a converter converting one form of energy, high voltage power, from one energy subsystem, an high voltage power electrical energy subsystem, to another form of energy, low voltage power, of another energy subsystem, a low voltage power electrical energy subsystem.

Every energy subsystem comprises at least one consumer, wherein a consumer is a devices at least consuming at least one form of energy within a respective subsystem. Every energy subsystem also comprises at least one producer, wherein a producer is a device configured to at least supply at least one form of energy to a respective energy subsystem. Every energy subsystem also comprises at least one converter. Respective energy subsystem has the converter in common with at least one of the other energy subsystems. The converters are provided for converting at least one energy form to energy of another energy form. This enables that energy can be provided in at least one direction between the different energy subsystems. There are also converters that can convert energy from one energy form into more than one energy form, whereby such converters will be common for more than two energy subsystems, and converters that can convert two or more forms of energy to a third energy form. The converters are either configured to convert one specific energy form to another energy form, such as an alternator converting mechanical power to electrical power, or configured to convert energy two-ways, meaning that such a converter may be able to both convert energy from a first energy form to a second energy form and from the second energy form to the first energy form. These converters are referred to as two-way converters.

However, according to one aspect of the inventive concept converters are always considered to be one way converters converting just one form of energy into one other form of energy. Thus, a converter able to convert energy two-ways are considered to be two separate converters converting energy in opposite direction. The effect will be the same when the inventive concept is implemented.

As stated, consumers are devices at least consuming at least one form of energy within a respective subsystem. ECUs, heating systems and power steering are examples of consumers that may be present in an energy subsystem. Producers are devices configured to at least supply at least one form of energy to respective subsystem. Actuators, compressors, batteries and first and foremost combustion engines are examples of producers that may be present in an energy subsystem.

Converters, converting one energy form into another energy form, acts as consumer in one energy subsystem and as producer in the other energy subsystem. As has been previously disclosed, each energy subsystem is required to comprise at least one energy producer, which provides energy to said energy subsystem, and at least one energy consumer, which consumes energy within said energy subsystem. Since converters can act as either producer or consumer it is sufficient that an energy subsystem comprises a converter acting as producer and consumer, a producer and a converter acting as a consumer or even two converters wherein a first converter is acting as a producer and a second converter is acting as a consumer. When referred to producers or consumers below, converters acting as producers or acting as consumers are also considered.

Normally a majority of all energy subsystems comprises a plurality of devices in addition to the minimum requirement previously disclosed; a producer and a consumer, a converter acting as a producer and a consumer, a producer and a converter acting as a consumer or two converters, wherein one converter is acting as a producer and one converter is acting as a consumer. In order to explain the inventive concept significantly simplified examples comprising only a very limited number of devices is disclosed herein.

For every energy subsystem added, and for energy device added, the complexity of the energy system will increase. However, the inventive concept works independently of the complexity of the energy system in which it is applied. In fact, one of the advantages with the inventive concept is that it is possible to add additional devices and/or energy subsystem to the energy system without having to make any adjustments of the energy management system of said energy system.

In certain embodiments of the inventive concept at least one energy subsystem may comprise an energy buffer. Energy buffers can act as either energy producers or energy consumers in an energy subsystem, depending on current energy balance of that energy subsystem, at a certain time. Energy buffer, and embodiments of the inventive concept utilizing energy buffers, will be disclosed more in detail later in the description.

According to the inventive concept, in order to control energy flows within said vehicle energy system at a first sample frequency SI a unitary energy price for respective energy subsystem for a time sample interval t+n continuously is set, where t is time a sample begins and n defines the length of the sample. The respective unitary energy price is dependent on a total energy demand and a total energy supply of said converters, consumers and producers of respective energy subsystem. Further, during said time sample interval t+n a quantity of power is provided to a first energy subsystem from a second energy subsystem, wherein the provided quantity of power corresponds to a determined supplied quantity of power of said common converter at the unitary energy price of said first energy subsystem. The determined supplied quantity of power is the quantity of power said converter can provide to the first energy subsystem to the unitary energy price that is determined according to the inventive concept for the first energy subsystem.

The quantity of power provided from the second energy subsystem to the first energy subsystem referred to above can be determined according to different correlating calculation methods which all are considered to be within the scope of the inventive concept.

According to one preferred embodiment of the inventive concept the quantity of provided power, provided from the second energy subsystem to the first energy subsystem, corresponds to the quantity of power consumed by the converter, wherein the converter according to this embodiment acts as a consumer, at the unitary energy price of the second energy subsystem.

As previously stated, the common converter has a marginal efficiency which is dependent on quantity of provided power. According to yet one preferred embodiment of the inventive concept the quantity of provided power to the first energy subsystem from the second energy subsystem corresponds to the quantity of provided power by the converter corresponding to the market price ration between the first and the second energy subsystem divided by the marginal efficiency of the common converter. The marginal efficiency will be described more in detail later.

This can also be expressed as that the unitary energy price of the first energy subsystem is equal to the unitary energy price of the second energy subsystem divided by the marginal efficiency of the common converter or that the unitary energy price of the second energy subsystem is equal to the unitary energy price of the first energy subsystem times the marginal efficiency.

The unitary energy price of respective energy subsystem is set such that the total amount of available power is distributed in the energy system in the most energy efficient way. The quantity of power provided is also limited by a power limitation of said common converter. Examples of how the unitary energy price of respective energy subsystem is set, how the quantity of provided power is determined and how the provided power is limited by the power limitations will be disclosed more in detail later in the description.

The inventive concept is continuously applied for all energy subsystems of the energy system. Hence, if the unitary energy prices are set correctly, the problem of minimizing the total energy consumption is transferred to the problem of minimizing the energy cost for each subsystem, eliminating the need for a global optimization algorithm.

According to one embodiment of the inventive concept the unitary energy price is preferably expressed in consumption of suitable unit or the value of consumed unit per unit of provided power, such as e.g. grams of fuel consumed per unit of useful energy provided or cost per unit of useful energy provided. The unitary energy price of energy for an energy subsystem is dependent on a total possible energy supply and a total possible energy demand of all energy producers and all energy consumers respectively, within an energy subsystem. Consequently, all producers and/or consumers that are connected to an energy subsystem will affect the unitary energy price of power for that energy subsystem. In order to calculate the unitary energy price of respective energy subsystem for a time sample interval t+n the unitary energy prices of the previous sample interval t are used as input.

According to another embodiment of the inventive concept the first sample frequency SI is set in order to control energy flows of the energy system of the vehicle. The first sample frequency SI generates the first time sample interval t+n. Thus, the length of each sample is set to n. A higher sample frequency corresponds to a shorter sample interval, thus shorter time between the samples. The inventive concept is continuous, meaning that the operations performed according to the inventive concept are repeated according to the first sample frequency SI. It is in the beginning of each sample the respective unitary energy price for respective form of energy of respective energy subsystem is determined. As input for determining the unitary energy price of respective energy subsystem for the time sample interval t+n the unitary energy price of respective energy subsystem, the marginal efficiency of δ respective converter and producer, the specific parameters of all concerned components of the energy subsystems, which are included in the determination of respective unitary energy price, is taken at the time t.

Hence, according to one preferred embodiment of the inventive concept the values of the parameters specific for respective energy subsystem at the time sample interval t+n are the actual parameter values at the sample interval t.

It is also possible to use a continuously running function that determines when the specific parameters used as input for respective sample has changed sufficiently to make it worthwhile to recalculate respective unitary energy price. Herein we will refer to the previously disclosed time sample interval approach but one should bear in mind that also this other embodiment is possible.

According to yet one preferred embodiment of the inventive concept the respective unitary energy price of respective energy subsystem is dependent of parameters specific for respective energy subsystem. The parameters specific for respective energy subsystem can all be related to that at least one component of that energy subsystem is dependent on that specific parameter. Hence, the energy subsystem is dependent on every specific parameter that any of said energy subsystems components is dependent on. To give an example; a pneumatic energy subsystem may be highly dependent on the ambient air temperature since this temperature has significant impact on the air pressure of an air pressure tank and a thermal energy system may be highly dependent on how frequently the vehicle provided with means for running the inventive concept is used due to the not negligible temperature equalization over time.

For all converters an efficiency, eta_tot, and a marginal efficiency, eta_marg, can be determined.

$$eta\_tot = \frac{P\_out}{P\_in}$$

where P_out is the outputted power that the converter provides, P_in is the inputted power the converter is provided with in order to provide P_out as output and eta_tot is the total efficiency, which is dependent on the power provided by the converter.

To clarify, the efficiency of a converter expresses how much of the power that remains after conversion in relation to the power provided to the converter. The rest of the provided power is conversion losses. In general, the efficiency of a converter is dependent on the power converted, which means that the efficiency actually changes with converted quantity of power. Thus, the efficiency for a converter is only valid at a certain stationary quantity of converted power.

The marginal efficiency measure can be defined as how much the converted power will change in a given stationary quantity of converted power if the provided power is changed. The marginal efficiency is the efficiency at the marginal, and not the marginal of the efficiency. In more detail, the marginal efficiency is defined as the additional power outputted for an additional unit of power inputted (to a converter) at each possible output power (of a converter).

More formally, if the outputted power P_out is written as a function of the inputted power P_in, P_out=f(P_in), the marginal efficiency is the derivative of this function.

That is the marginal efficiency, eta_marg, is defined by:

$$eta\_marg = \frac{dP\_out}{dP\_in}$$

The power respective converter can provide is generally limited by a maximum quantity of provided power for respective converter, and also by a minimum quantity of provided power. Also the quantity of power a converter can convert may be limited both in regards of maximum converted power and minimum converted power. The same applies for other producers and consumers. By setting said maximum and minimum levels it can be ensured that possible power limitations of converters, producers and/or consumers are not violated.

When the quantity of power provided by a converter or producer or consumed by a converter or consumer is determined and such determined value exceeds the maximum limitation or minimum limitation of respective converter, producer or consumer the provided or supplied quantity of power is set to be as close as possible to determined quantity but within the maximum and minimum limitations or respective converter, producer and/or consumer.

According to one embodiment of the inventive concept each energy producer is provided with an energy supply-price function and each energy consumer is provided with an energy demand-price function. Thus, converters and energy buffers acting as both consumers and converters have both an energy supply-price function and an energy demand-price function.

Supply-price functions are functions describing how the unitary energy price of an energy producer changes with supplied quantity of power from respective producer. Correspondingly, demand-price functions are functions describing how the unitary energy price of a controllable consumer changes with consumed quantity of power.

The difference between consumers and controllable consumers will be disclosed later in the description.

Respective energy supply-price functions and/or respective energy demand-price function is dependent on parameters specific for respective converter, producer and/or consumer. To set said unitary energy price according to this embodiment of the inventive concept the following is performed for respective energy subsystem; summarising the energy supply-price functions of the producers, or of converters acting as producers, of respective energy subsystem into an aggregated supply-price function, and summarising the energy demand-price function of the consumers, or of converters acting as producers, of respective energy subsystem into an aggregated demand-price function.

The unitary energy price of respective energy subsystem can according to this embodiment subsequently be provided by comparing said aggregated supply-price function and said aggregated demand-price function of respective energy subsystem whereby said unitary energy price is set to a value corresponding to the unitary energy price where said energy supply and said energy demand is equal.

According to the inventive concept the determinations of the supply-price functions and the demand-price functions is performed continuously in accordance to the first sample frequency. Hence, for every time sample interval new supply-price demand functions and demand-price functions for all consumers and/or producers respectively are determined.

The energy supply-price functions of the aggregated supply-price function are summed up by adding the respective energy quantity supply contribution of each producer. Correspondingly, the energy demand-price functions of the aggregated energy demand-price function are summed up by adding the respective energy quantity demand contribution of each consumer. Hence, the aggregated supply-price functions and the aggregated demand-price functions respectively represent the total energy supply and demand of all the producers and consumers of an energy subsystem. By comparing the aggregated supply-price function and the aggregated demand-price function an equilibrium is found where the functions coincide.

When applying for example the Marshall equilibrium theory, in this application for minimizing the overall fuel consumption for a vehicle as according to the point where the aggregated supply-price function and the aggregated demand-price function crosses, it is possible to give the optimal unitary energy price for energy of respective energy subsystem. The Marshall equilibrium theory is a micro economics theory stating that an equilibrium between supply and demand can be found in a so called perfect market economy. At this equilibrium there is an optimal distribution of resources.

Once the unitary energy price for the energy subsystem has been provided this unitary energy price can be used to determine the quantity of energy that should be provided by respective producer. When referring to producers and consumers also converters acting as producers or consumers are considered. According to one embodiment of the inventive concept this may be determined by looking at respective supply-price function of respective producer and determine what quantity of power that said producer supplies to the determined unitary energy price. Correspondingly, the amount of power provided to respective consumer may be determined by looking at respective demand-price function and at what quantity of power that is provided to respective consumer at the determined unitary energy price.

Each energy producer has its own individual supply-price function and each energy producer has its own marginal efficiency expressing how the efficiency of the producer changes when converting one form of energy to another form of energy with supplied power.

As a clarifying example, a producer in form of a combustion engine is disclosed:

A combustion engine, which herein is referred to as a producer, converts energy bound in the form of energy chemically stored in a fuel to mechanical energy. The combustion efficiency, hence the amount of chemically bound energy originally stored in the fuel that actually is converted to mechanical energy, is the efficiency of the combustion engine.

According to this example, the price for produced power is specified in g fuel/kWh and the quantity of power provided is specified in W. In general, the price for supplying a specific quantity of power is given by the unitary energy price for power consumed by the producer divided by the marginal efficiency of the producer. The example refers to a consumer, but the same applies for a converter acting as a consumer. The supply-price function for the producer is determined according to:

$$p\_power\_out = \frac{p\_power\_in(Q\_power\_out)}{Prod\_eta\_marg}$$

where Prod_eta_marg is the marginal efficiency of the producer and p_power_in is the unitary energy price of the power consumed. p_power_out is the unitary energy price of the produced power. For a converter the produced power is the form of energy that the converter has converted power to.

According to the previous example with the combustion engine this gives that:

$$p\_Me = \frac{p\_Fuel}{CombEng\_eta\_marg}$$

wherein p_Me is the unitary energy price for mechanical energy of the mechanical energy subsystem, p_Fuel in the price of the fuel consumed by the combustion engine and CombEng_eta_marg is the marginal efficiency of the combustion engine.

Hence, the power in is the energy stored in the fuel and the power out is the mechanical energy produced by the combustion engine.

Now looking at another example of the determination of a supply-price function for an alternator, hence a converter $$p\_El = \frac{p\_Me}{Alt\_eta\_marg}$$

where p_El is the unitary energy price for electrical energy of the electrical energy market, Alt_eta_marg is the marginal efficiency of the alternator and according to above p_Me is the unitary energy price for mechanical energy of the mechanical energy subsystem. For a converter the supply-price function will give the unitary energy price for the power the converter consumes.

Correspondingly, demand-price functions are functions describing how the unitary energy price of a controllable consumer changes with consumed quantity of power. Correspondingly, each controllable consumer has its own marginal efficiency expressing how the efficiency of the consumer changes with consumed power.

The demand-price functions for controllable consumers are determined by multiplying the marginal efficiency of the controllable consumer with the unitary energy price of the subsystem of the consumer according to:

$$p\_power\_in = p\_power\_out * Cons\_eta\_marg$$

where Cons_eta_marg is the marginal efficiency of the consumer, p_power_in is the unitary energy price of the subsystem and p_power_out price for the power which can be benefited from. Controllable consumers will be disclosed more in detail later in the description.

Looking once again at an alternator, this time acting as a consumer in a mechanical energy subsystem:

$$p\_Me = p\_El * Alt\_eta\_marg$$

where p_Me is the unitary energy price for mechanical energy consumed, p_El is the unitary energy price for the electrical energy produced and Alt_eta_marg is the marginal efficiency of the alternator.

Consumers of an energy subsystem may be either controllable or uncontrollable. Uncontrollable consumers are price independent. Hence, the demand-price function for an uncontrollable consumer is fixed to the quantity of power required by the uncontrollable consumer. Converters are preferably controllable consumers, meaning that the quantity of consumed power can be controlled. Also energy buffers, which will be disclosed more in detail later in the description, may be considered to be controllable consumers. The operation of an energy buffer may be directly controlled or indirectly controlled in that they simply may be provided with energy when there is a surplus of energy within respective energy subsystem, and may provide energy to the respective energy subsystem when there is a shortage of energy within the energy subsystem. Since the quantity of consumed power can be controlled it is possible to adjust the quantity of consumed power for such controllable consumers dependent on the current energy balance of the vehicle. Such consumers are price dependent.

Some consumers, such as e.g. lamps and ECUs, are not controllable in the same meaning as other consumers or converters. Taking e.g. an ECU (Electronic Control Unit) and a compartment lighting device of an electrical energy subsystem of a vehicle as example; the ECU is activated by default at vehicle start up, hence is required to be supplied with electrical energy as long as the vehicle is turned on. The compartment lighting device is preferably not turned on by default, but independently of the overall energy balance of the vehicle, if the driver requests the compartment lighting device to be turned on it instantly has to be supplied with sufficient electrical power. Such consumers are uncontrollable consumers. Uncontrollable consumers consume a fix quantity of power independently on the price for respective quantity of power. Thus, uncontrollable consumers are price independent.

The demand-price function of the price independent, uncontrollable consumers will be in the form of a vertical scalar offsetting the aggregated demand-price function of respective energy subsystem with a quantity of power corresponding to respective energy need of respective uncontrollable consumer.

Looking once again at supply-price functions and demand-price functions; the minimum and maximum provided or consumed quantity of power for respective converter, producer and/or consumer are given by the quantity of respective supply-price function and/or demand-price function. As previously stated, when applying the inventive concept and performing the previously described determinations of which quantity of power a producer should provide to an energy system or which quantity of power a consumer should be supplied with it is possible that the determined quantity exceeds the maximum quantity, or minimum quantity, respective producer and/or consumer can provide or be provided with. If this occurs, the provided or supplied quantity of power being as close as possible to determined quantity, but within the maximum and minimum limitations or respective producer and/or consumer, is used.

According to another preferred embodiment of the inventive concept the method may be applied for an energy system for which at least one of the energy subsystems comprises an energy buffer. Energy buffers are configured for storing energy, wherein the energy stored in the energy buffer is in the same energy form as of respective energy subsystem, and providing energy within respective energy subsystem. In order to determine whether the energy buffer should provide energy to the energy subsystem or store additional energy a unitary energy buffer price is set.

The unitary energy buffer price of an energy buffer is dependent on a number of energy buffer specific parameters including at least the current amount of energy stored in respective energy buffer. The unitary energy buffer price will be disclosed more in detail in the detailed description of the drawings. In the embodiment of the inventive concept, depending on said set unitary energy price for respective energy subsystem the energy buffer can either be providing power within the energy subsystem, if the unitary energy price of that subsystem is higher than the unitary energy buffer price, or be storing power from the energy subsystem, if the unitary energy price is lower than the unitary energy buffer price.

If the unitary energy price is equal to the unitary energy buffer price may according to one embodiment of the inventive concept the energy buffer either be provided with or provide energy to respective energy subsystem such that an energy balance within said energy subsystem is maintained.

The presence of an energy buffer within an energy subsystem has many advantages such as that the presence of an energy buffer in many situations may contribute to that the energy balance of the energy system can be less fluctuant and be held on a more stable level.

As has been previously disclosed the unitary energy price is recalculated according to a first sample frequency SI. According to one embodiment of the inventive concept the unitary energy buffer price may be calculated according to a second sampling frequency S2, wherein said first sampling frequency SI is shorter than, or equal to, said second sample frequency S2. Having a lower second sampling frequency S2 will reduce the CPU (Computer Processing Unit) load.

According to another preferred embodiment of the inventive concept the method is initiated when the vehicle, provided with functionality to run the inventive concept, is started. Any suitable start up operation, such as turning on the vehicle ignition, may be used to trigger the initiation.

As previously stated the operations performed according to the inventive concept are repeated according to a first predefined sample frequency SI. Also as previously stated, the unitary energy buffer prices may be determined according to a second sample frequency S2, and independently of which sample frequency that is used, the input to e.g. the unitary energy price determinations are based on the values from the previous sample. However, when the method is initiated at vehicle start up there are no previous values that can be used as input for e.g. determination of the unitary energy price.

Hence, according to one preferred embodiment of the inventive concept, where the energy subsystem for which the inventive concept is applied comprises an energy buffer, the unitary energy prices are set to be equal to respective energy buffer price at the first sample interval after initiation of the method. If an energy buffer is present within an energy subsystem the energy balance of the energy buffer, hence the unitary energy buffer price, is generally significant for the unitary energy price of respective energy subsystem.

This embodiment has the advantage that the unitary energy prices, used as input when applying the inventive concept for the first sample e.g. after the vehicle ignition is turned on, of respective energy subsystem will be reasonably accurate without having to perform any complex calculations at vehicle start up. The system will subsequently adjust itself further during following samplings.

Now looking at the unitary energy buffer price of respective energy buffer at vehicle start up and the initiation of the inventive concept. As for more or less all vehicle components the internally, meaning within the vehicle, and externally, meaning outside the vehicle, prevailing vehicle conditions highly affects the energy buffer, thus are included in the specific parameters for respective energy buffer. As previously stated the unitary energy buffer price is dependent on the specific parameters.

Thus; according to one embodiment of the inventive concept the setting of a respective unitary energy buffer price at the initiation of the method is dependent on at least one prevailing vehicle condition such as e.g. ambient temperature, battery cell temperature, cooling water temperature or total vehicle mass. The method of determining a unitary energy price as of this embodiment can advantageously also be applied when calculating the unitary energy price of energy subsystems without an energy buffer.

According to another embodiment of the inventive concept the current unitary energy buffer price for respective energy buffer at the termination of the method is continuously saved. The unitary energy buffer price is preferably stored in the ECU. At a subsequent initiation of the method, at vehicle start up, the energy buffer price for respective unitary energy buffer is set according to the previously saved unitary energy buffer price. This has the advantage that the initial input values when the inventive concept is initiated at vehicle start up should be reasonably accurate. The system will subsequently adjust itself further during following samplings. This embodiment is particularly advantageous if the vehicle has only been turned off for a short period of time. This embodiment can advantageously be combined with the most previously described embodiment such that both saved unitary energy buffer prices and prevailing conditions are taken into consideration while determining the unitary energy buffer price. This has the advantage that even more accurate unitary energy buffer prices can be set at vehicle start up.

It is also desirable to control the switching between discrete states of a vehicle. This aspect of the inventive concept can be applied to a plurality of discrete states, and switches between different discrete states, of the vehicle, e.g. changing gear, turning on/off an air condition or turning on/off an electric actuator. According to the inventive concept as previously described the decision if a switch of the state of the vehicle should be executed is first and foremost determined by the momentary energy need and the momentary availability of energy within the energy system of the vehicle. According to this aspect of the inventive concept, such assessments can be performed continuously for a plurality of vehicle functionalities, assuring that all subsystems of the vehicle continuously are set in the most energy efficient state. This embodiment of the inventive concept operates continuously and controls various aspects of the vehicle where an assessment whether it is more advantageous to remain in a momentary state or to switch to a predicted state can be performed.

By applying this aspect of the inventive concept, enabling that the vehicle always is running in the most energy efficient state, it is possible to reduce fuel consumption even further.

According to one preferred embodiment of this aspect of the inventive concept the switching between different states of the vehicle may e.g. enable the implementation of start-stop functionality as an addition to the previously described inventive concept. Thus, according to one embodiment of this aspect of the inventive concept the two discrete states of the vehicle can be switching a combustion engine between a running state and a turned off state.

Hereinafter this aspect of the inventive concept will be described in general terms and relation to said specific embodiment wherein this aspect of the inventive concept implemented to control a start-stop functionality of a combustion engine.

According to yet one embodiment of this aspect of the inventive concept, in order to select one of at least two discrete states the following operations are performed;
  calculating a momentary net cost, wherein said momentary net cost is a cost for the vehicle to stay in said momentary state,
  calculating a predicted net cost, wherein said predicted net cost is a cost for the vehicle to be in said predicted state, and
  calculating a switch cost, wherein said switch cost is a cost for switching state of the vehicle.

Said momentary net cost and said predicted net cost are dependent on the unitary energy price of the energy subsystem comprising the component performing the switch of state of the vehicle. According to the embodiment of the inventive concept referred to above, where this aspect of the inventive concept is implemented to control a start-stop functionality, the relevant energy subsystems is the mechanical energy subsystem comprising the combustion engine and all energy subsystems connected to the mechanical energy subsystem by converters.

Thus, the unitary energy prices can preferably be obtained by applying the inventive concept for managing energy flows within an energy subsystem of a vehicle as previously described. Subsequently, based on said momentary net cost, said predicted net cost and said cost for switching state of the vehicle, it is possible to determine if a switch of state of the vehicle from said momentary state to said predicted state should be performed.

The momentary net cost, the predicted net cost and the switch cost will be described more in detail later.

By implementing the inventive concept in a vehicle for determining when a switch from a momentary discrete state to a predicted discrete state is favorable from a overall energy cost perspective it is assured that the vehicle continuously is driven in the most energy efficient way.

According to one embodiment of the inventive concept said momentary state is said first state and said predicted state is said second state, and the switch cost is either a switch on cost or a switch off cost. According to yet one embodiment of this aspect of the inventive concept said cost for switching state of the vehicle is the cost for switching from the first state to the second state.

According to yet another preferred embodiment of this aspect of the inventive concept said switch cost, or cost for switching state of the vehicle, is dependent on a predicted time during which said vehicle is predicted to be in said second state. By making the cost for switching state of the vehicle time dependent it is possible to prevent or at least counteract that the combustion engine is turned off and turned on recurrently which may be perceived as annoying by a driver. This can be understood by looking at the calculation of the cost for switching state as is described below.

This feature can be clarified further by referring to the embodiment of the inventive concept for controlling the switching between discrete states of a vehicle when being implemented as a start-stop functionality. According to this embodiment the inventive concept controls if the combustion engine should be kept on or turned off at vehicle stand still.

According to this embodiment, when the vehicle stops e.g. at red light, the cost for switching state of the combustion engine on is calculated according to:

$$C\_SwEngState = Q\_starter\_engine * t\_start\_engine * (p\_el\_engine\_off / t\_pred\_engine\_off),$$

where (_starter_engine, specified in kW, is the average effect of the starter engine used to start the combustion engine during the time it takes for the starter engine to start the combustion engine, referred to as t_start_engine, specified in s (seconds). p_el_engine_off is the price for electrical power when the combustion engine is turned off, specified in g/kWh, and t_pred_engine_off, also specified in s (seconds), is the predicted remaining time until vehicle take off.

The cost for switching state of the combustion engine, C_SwEngState, will be described more in detail together with FIG. 7.

How the predicted time before vehicle take off is determined may be dependent on the application of the vehicle. The predicted time period may be calculated by using an average value, a median value or like of recorded information or information provided to the ECU (Engine Control Unit) or like by default. The recorded information may be a recording of the length of actual vehicle stops or may come from other vehicles which can be expected to show the same driving behavior, e.g. belonging to the same fleet of vehicles. It is also possible to use information which can be acquired by GPS, from traffic information broadcasts etc., such as topology, upcoming road characteristics or traffic jams, for predicting the time the vehicle will stand still.

According to yet one preferred embodiment of such inventive concept said switch cost is a switch on cost. This embodiment is e.g. applicable for the example referred to above where the inventive concept is applied to control a start-stop functionality.

According to a development of that embodiment the switch on cost may have a constant value. By setting a constant value for switching on the combustion engine the predictability of the start-stop functionality can be improved.

According to an even more preferred embodiment of this aspect of the inventive concept said constant switch on cost is set to be essentially equal to zero. For vehicles provided with start-stop functionality the combustion engine needs to be turned on at some point, i.e. at vehicle take off when the driver requests acceleration. According to this embodiment of the inventive concept the cost related to turning on the combustion engine is set to zero and instead the cost for turning the engine off have to bear the additional cost for turning the engine back on. This will add an inherent resistance to switching state from the momentary state to the predicted state, in the embodiment where the inventive concept is implemented to control a start-stop functionality showing as an inherent resistance against turning off the combustion engine when the vehicle stops. This will counteract that the combustion engine is turned off only to be turned back on just a few seconds later, which would be experienced as annoying for the driver.

For the embodiments where this aspect of the inventive concept is applied for a combustion engine, i.e. in order to control when to turn on and off the combustion engine, it is possible to avoid short term state switches which will reduce the overall number of times the engine is turned on or off.

From a fuel efficiency perspective it is obviously advantageous to turn off the combustion engine when the mechanical power generated by combustion engine is no longer needed, which may be the case e.g. when stopping at red light. However, the fuel consumption is at its highest during start up of the combustion engine and the main part of the exhaust gas emissions from combustion engines is emitted during engine start up, especially if the engine is cold. Thus, if start-stop functionality is used in order to turn off the engine when the vehicle is standing still it is still important to limit the number of combustion engine start-ups. If the combustion engine is turned off, and subsequently turned on, repeatedly this will be perceived as annoying by the driver.

Thus, when utilizing start-stop functionality limiting the number of vehicle start ups will save fuel and lower the emissions, but it will also prevent excessive wear of the combustion engine and reduce the experienced annoyance of a repeatedly restarted combustion engine.

According to another embodiment of the inventive concept, when being applied to control the states of a combustion engine, the combustion engine of said vehicle is running in said first state of the vehicle and is turned off in said second state of the vehicle.

Since there is no additional fuel consumption or like giving rise to any cost related to the actual turning off of the engine, the only cost for switching off the engine will be the cost due to the energy consumption and or system wear when subsequently starting the combustion engine. Starting the combustion engine is normally performed by using a starter engine. Consequently, according to one embodiment of this aspect of the inventive concept the switch off cost is dependent on the energy consumption of the starter engine when starting the combustion engine.

As previously stated, frequently occurring start and stops of the combustion engine will be annoying for the driver. According to another embodiment of this aspect of the inventive concept for switching state of the vehicle from said momentary state to said predicted state, the assessment whether a switch of state should be executed is dependent on an annoyance penalty term. The annoyance penalty term is preferably added as an additional cost for the predicted state, wherein this state will be less favorable. By adding this annoyance penalty term an hysteresis will be added to the system which will decrease frequently occurring combustion engine starts and stops. The annoyance penalty term is preferably chosen depending on how influential it is desirable that the annoyance penalty term should be.

Yet another aspect of the present invention is to optimize fuel consumption by optimized gear selection.

If the torque delivered by a combustion engine of a vehicle is close to what ultimately can be delivered by the combustion engine when driving in current gear an increase in requested combustion engine load may force downshift and thereby an increase in fuel consumption. The total engine load comprises energy demand from any auxiliary systems of the vehicle and requested combustion engine torque for propelling the vehicle.

The auxiliary systems are energy consumers of the energy system of the vehicle that are not directly connected to the propelling of the vehicle, thus are not part of the driveline, but that still are necessary for the overall functionality of the vehicle. Examples of such auxiliary systems are cooling fans, oil-pumps, an alternator lamps and air conditioning. Even though not being directly connected to the mechanical energy subsystem of the combustion engine, the power consumed by such auxiliary systems may increase the amount of required mechanical power from the mechanical energy subsystem in that the energy subsystems of such auxiliary systems may be directly or indirectly connected to the mechanical subsystem. Thus, an energy demand of such auxiliary system may ultimately give rise to an additional combustion engine load due to that the combustion engine has to generate more mechanical power. This is referred to as auxiliary load.

According to one embodiment of this aspect of the inventive concept by managing the energy flows within the energy system of the vehicle downshifting can be avoided by reducing the auxiliary load. This embodiment of the inventive concept is executed according to a sample frequency S4, which may be equal to or different from the sample frequencies SI, S2 and S3.

Hence, according to one embodiment of this aspect of the inventive concept the method can preferably be applied for en energy system of a vehicle comprising a mechanical energy subsystem, wherein the mechanical energy subsystem uses mechanical energy, and wherein the mechanical energy subsystem comprises a combustion engine. Said vehicle additionally comprises a plurality of auxiliary systems of various energy subsystems. Said combustion engine is part of a driveline further comprising a multi gear transmission. Said plurality of auxiliary systems can be any auxiliary system of the vehicle.

Further, according to one embodiment of this aspect of the inventive concept said method comprises accessing information about an upcoming travel route for a predetermined time horizon. Such information may be provided by e.g. navigation equipment or like based on e.g. GPS (Global Positioning System) and electronic map.

This information is subsequently analysed, wherein said information can be used in a known way to determine if said upcoming travel route comprises an uphill slope, and if so how long that uphill slope is.

Further, if said upcoming travel route comprises an uphill slope the power needed from said combustion engine to climb said uphill slope in the already engaged gear is determined.

Further, a currently maximal available power for climbing said uphill slope is determined from predicted travelling resistance based on said uphill slope information. The power needed from said combustion engine may e.g. be dependent on the length of said uphill slope and how steep said uphill slope is. Said maximal available power is the part of the total amount of mechanical power produced by the combustion engine that can be used for propulsion of the vehicle. This part of the total amount of mechanical power is the mechanical power remaining after the mechanical power currently converted by the energy converters of respective energy subsystems connected to the mechanical energy subsystem, in order to provide respective auxiliary systems with power, has been subtracted according to the method of managing energy flows within an energy system as previously described.

Said determined power needed is compared with said maximum available power, and based on that comparison it is determined if said vehicle can climb said uphill slope with the already engaged gear. If it is determined that driving uphill said slope can be done without changing gear or reducing the auxiliary load the method is continuously executed without further actions taken.

If it is determined that in order to climb said uphill slope the vehicle should change gear a penalty cost for selecting a reduced gear is assigned. Such penalty cost is subsequently added to the unitary energy price of mechanical energy. As stated, this embodiment of the inventive concept is executed according to a sample frequency S4. According to the inventive concept for managing energy flows within an energy system adding said penalty cost will increase the unitary energy price for mechanical energy when the inventive concept subsequently is executed, which will result in that it will be more costly for the energy subsystem previously provided with mechanical energy to be provided with power from the mechanical energy subsystem. Since the mechanical energy subsystem comprising the combustion engine is the main source of energy such increase of the unitary energy price of mechanical energy will have high impact on all energy subsystems, and will affect the unitary energy prices of all energy subsystem, and consequently the entire energy distribution within the energy system. Thus, by manipulating the unitary energy price for mechanical energy by adding the penalty cost the inventive concept will automatically adopt the energy flows within the energy system such that required power will be made available for the propulsion of the vehicle prior to driving up approaching uphill slope.

To give an example; for an electrical energy subsystem, which previously has been provided with mechanical power, converted to electrical power by an alternator, in order to provide an consumer of said electrical energy subsystem with electrical power and for which also a battery continuously has been charged, after the unitary energy price for mechanical energy has been increased by adding the penalty cost, the consumer may have to be provided with power from elsewhere and it may even be favourable for the electrical energy subsystem to provide electrical energy, preferably converted to mechanical power by an electrical engine, to the mechanical energy subsystem. The inventive concept automatically performs all changes of energy flows within the energy system, deriving from the manipulation of the unitary energy price for mechanical energy.

According to one embodiment of this aspect of the inventive concept said penalty cost is dependent on a length of said uphill slope. According to another embodiment of this aspect of the inventive concept said penalty cost is dependent on how steep said uphill slope is, or in other words dependent of degree of travelling resistance. Setting the penalty cost according to the length and/or the steepness of the uphill slope has the advantage that the penalty cost can be set in relation to the increase in combustion engine load travelling uphill said slope will cause. This will give a more accurate penalty cost, which will give an overall more accurate mechanical power distribution balance.

Also within the scope of present invention is a control unit for controlling energy flows of a vehicle, wherein the control unit is being configured to perform the steps of the inventive concept. The control unit is preferably provided in a vehicle, wherein the vehicle comprises an energy system. The energy system comprises a plurality of energy subsystems, which energy subsystems comprises at least an producer, or a converter acting as a producer, and an consumer, or a converter acting as a consumer, and wherein the vehicle is provided with such control unit. Such vehicle is also within the scope of present invention. Finally, within the scope of present invention is also a computer program comprising code means for performing the steps according to any embodiment of the inventive concept, when said computer program is run on a computer, and a computer readable medium carrying such computer program comprising program code means for performing the steps according to any embodiment of the inventive concept when said program product is run on a computer.

Further advantages, advantageous features and advantageous embodiments of the invention are discloses in the following description of and in appended drawings.

DETAILED DESCRIPTION

Figure 1A:
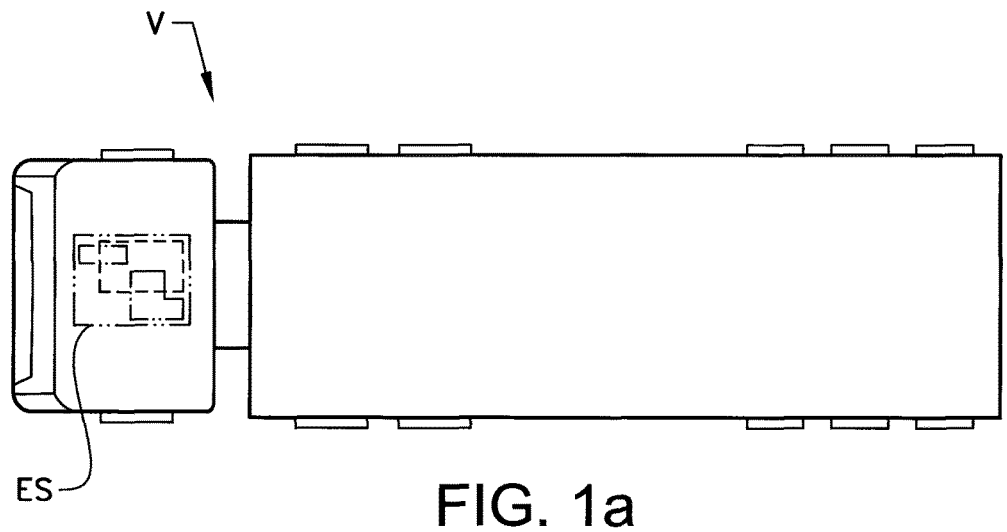
FIG. 1a shows a vehicle provided with an energy system.

FIG. 1a shows a vehicle V. In the shown embodiment of the vehicle V it is indicated that the vehicle V comprises an energy system ES.

Figure 1B:
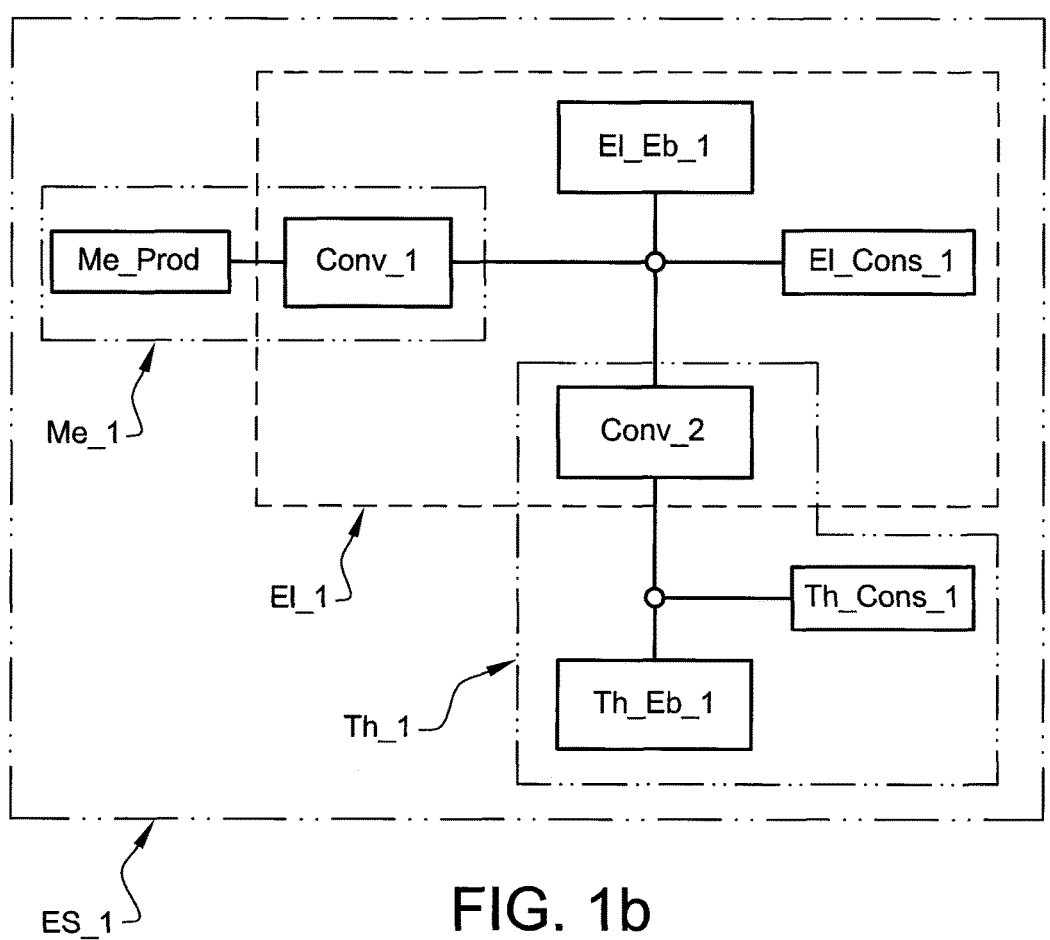
FIG. 1b shows a schematic view of a simplified energy system.

FIG. 1b shows a schematic view of an embodiment of a simplified energy system ES_1 of the vehicle V. The embodiment of the energy system ES_1 shown is significantly simplified in order to explain the inventive concept in a clear and concise manner. In the embodiment shown the energy system ES_1 comprises three energy subsystems; a mechanical energy subsystem Me, an electrical energy subsystem El_l and a thermal energy subsystem Th_1.

The mechanical energy subsystem Me forms a mechanical energy market where mechanical power is the form of power that is produced and consumed. Correspondingly, the electrical energy subsystem El_1 forms an electrical energy market and the thermal energy subsystem Th_1 forms a thermal energy market where electrical power and thermal power respectively are produced and consumed. The subsystems Me; El_1; Th_1 comprises at least one converter Conv_1; Conv_2 each, wherein the converters Conv_1; Conv_2 can convert energy from one form, such as e.g. mechanical energy, electrical energy or thermal energy, into another form of energy. The converter Conv_1; Conv_2 acts as consumer in the energy subsystem Me; El_1 wherefrom the converter Conv_1; Conv_2 converts power and as a producer in the energy subsystem El_1; Th_1 to which the converter Conv_1; Conv_2 provides power.

According to the inventive concept, depending on the balance between produced and consumed power a unitary energy price is set for power on respective energy market.

According to the embodiment shown in FIG. 1b, wherein the producer Me_Prod of the energy system ES_1 is a combustion engine, the unitary energy price is preferably expressed in grams of fuel consumed per unit of useful energy provided. This will be disclosed more in detail later on. This embodiment will now be referred to in order to explain unitary energy price.

Depending on what type, or types, of producers the energy system comprises a variety of fuels are possible, but according to a preferred embodiment of the invention where the energy system comprises a compression ignited combustion engine the fuel referred to could e.g. be diesel. Of course other types of known combustion engines are possible as well.

The price of fuel is the energy density of the fuel given in grams of fuel that corresponds to 1 kWh. Hence, the price for the energy produced is specified in g/kWh. According to the embodiment in FIG. 1b, this is referred to as the unitary energy price of the energy system ES_1.

The unitary energy price for producers and/or consumers generally changes with the quantity of produced or consumed energy. This is because of that the marginal efficiency of any producer and/or consumer is dependent on the power produced and/or consumed. For each producer and/or consumer this generates a supply-price function and/or a demand-price function. This will be more thoroughly discussed together with FIGS. 2a, 2b and 2c.

Generally, when other producers than a combustion engine is used, such as e.g. plug-in functionality, or if a combination of various producers is used, it is more suitable to specify the cost for energy in e.g. € or $ per kWh. Thus, e.g. €/kWh or like is preferably used if other producers than a combustion engine is present.

Based on respective unitary energy price of two energy subsystems and a marginal efficiency of a converter common for the two energy subsystems power produced in one of the subsystems can be provided to the other subsystem. According to the inventive concept power is provided from a second energy subsystem to a first energy subsystem if a calculated unitary energy price of the first energy subsystem is equal to a unitary energy price of the second energy subsystem divided by a marginal efficiency for the converter for conversion of energy from the second energy subsystem to the first energy subsystem. As disclosed, the marginal efficiency of the converter is in turn dependent on the power converted. Hence, if and to what magnitude power is converted between two energy subsystems is dependent on the characteristics of concerned converter and the unitary energy price of respective energy subsystem. Also, as will be described later on, the quantity of power provided from the second energy subsystem to the first energy subsystem may be restricted by limitations of maximum quantity of power respective converter is able to provide.

In the embodiment of an energy system ES_1 shown in FIG. 1b the mechanical energy subsystem Me comprise a producer Me_Prod and the converter Conv_1, wherein the converter Conv_1 is connected to the producer Me_Prod. The converter Conv_1 converts the mechanical power produced by the producer Me_Prod to electrical power, which the converter Conv_1 subsequently can provide to the electrical energy market, herein represented components Conv_2; El_Cons_1; El_Eb_1 of the electrical energy subsystem El_1. According to the exemplified embodiment the producer Me_Prod could be a combustion engine and the converter Conv_1 could be an alternator, but also other producers and converters producing and converting mechanical power are possibly used.

The mechanical energy subsystem El_1 shares the converter Conv_1 with the electrical energy subsystem El_1. Hence, the converter Conv_1 is common for the mechanical power subsystem Me and the electrical energy subsystem El_1. Since the total efficiency of the converter Conv_1 generally is lower than 1 there will be power losses incurred due to the conversion of mechanical power to electrical power.

According to the embodiment shown in FIG. 1b, except for the common converter Conv_1 the electrical subsystem El_l comprises an energy buffer El_Eb_1, a consumer El_Cons_1 and a second converter Conv_2. The first common converter Conv_1 is connected to the buffer El_Eb_1, the consumer El_Cons_1 and the second converter Conv_2 such that electrical power can be provided by the common converter Conv_1 to the energy buffer El_Eb_1, the consumer El_Cons_1 and the second converter Conv_2. the energy buffer El_Eb_1 is connected to the consumer El_Cons_1 such that the consumer El_Cons_1 also can be provided with electrical power from the energy buffer El_Eb_1. The energy buffer is also connected to the second converter Conv_2 which the electrical energy subsystem Me has in common with the thermal energy subsystem Th_1. According to the embodiment shown in FIG. 1b the energy buffer El_Eb_1 could be a battery and the consumer El_Cons_1 could represent a number of components consuming electrical power such as e.g. lamps and ECUs.

Also in the thermal energy subsystem Th_1 the common second converter Conv_2 is connected to an energy buffer Th_Eb_1, such that the energy buffer Th_Eb_1 can be provided with thermal power from the common second converter Conv_2. The energy buffer Th_Eb_1 is connected to the consumer Th_Cons_1 such that the energy buffer Th_Eb_1 can provide thermal energy to the consumer Th_Cons_1. According to the embodiment shown in FIG. 1b the common second converter Conv_2 could be an electrical cooling fan, the energy buffer Th_Eb_1 could be any type of thermal energy buffer and the consumer Th_Cons_1 could be a retarder.

Energy buffers El_Eb_1; Th_Eb_1 are devices that are able to both store energy provided to the energy buffer El_Eb_1; Th_Eb_1 and to provided energy to respective energy subsystem El_1; Th_1, depending on prevailing energy balance. Hence, an energy buffer may either act as a producer or a consumer in an energy subsystem. Depending on type of energy buffer El_Eb_1; Th_Eb_1 different forms of energy can be stored and provided.

In order to explain the functionality of an energy buffer a battery of a vehicle will be used as clarifying example.

A battery provided in a vehicle and acting as an energy buffer can store electrical power if there is a surplus of electrical power in the electrical energy subsystem and can, depending on current state of charge (SoC), provide power to the electrical energy subsystem if there is a shortfall of electric energy. The maximum SoC is an example of an important specific parameter for a battery acting as an energy buffer.

It should be noted that the embodiment shown in FIG. 1b, comprising just three energy subsystems Me; El_1; Th_1, and a very limited number of components Me_Prod; Conv_1; Conv_2; El_Cons_1; Th_Cons_1; Th_Eb_1; El_Eb_1, is significantly simplified for clarification purposes. Also, the suggested producer, converter, energy buffer and consumer components stated are just examples of what components respective producer, converter, energy buffer and consumer can represent. This embodiment should be seen as a clarifying example and is not to be seen as limiting for the invention.

Starting from the embodiment shown in FIG. 1b a more detailed description of the energy system ES_1 will now be presented. The producer Me_Prod of the mechanical energy subsystem Me is preferably a combustion engine. The combustion engine runs on fuel.

As has been disclosed above, a common converter Conv_1; Conv_2 is included in at least two energy subsystems Me; El_1; Th_1 and can convert energy in at least one direction. By converting one form of energy to another form of energy the converters Conv_1; Conv_2 act as consumers in a first energy subsystem and as producers in a second energy subsystem. As stated, each converter has an efficiency, which is a measurement of the efficiency of the conversion performed by the converter, and a marginal efficiency. The marginal efficiency of a converter expresses how much a small change in provided power changes the converted power depending on the amount of converted power.

In the embodiment disclosed in FIG. 1b the converter Conv_1 is the alternator converting mechanical power produced by the producer Me_Prod, being a combustion engine, to electrical power which is provided to the electrical energy subsystem El_l. The converter Conv_1 can only convert mechanical power to electrical power and not electrical power to mechanical power. Except for the converter Conv_1, acting as a producer on the electrical energy market, the electrical energy subsystem El_l comprises the energy buffer El_Eb_1, in form of a battery, the consumer El_Cons_1, representing lamps and ECUs, and the second common converter Conv_2 in form of the electrical cooling fan.

The battery El_Eb_1 can be provided with electrical power from the alternator Conv_1, and El_Eb_1 can provide electrical power to the electrical cooling fan Conv_2 and the consumer El_Cons_1. The electrical cooling fan Conv_2 may use the electrical power from the battery El_Eb_1 for cooling the coolant water of a thermal energy buffer Th_Eb_1. Hence, electrical power from the electrical energy market is converted to thermal power by being converted by the electrical cooling fan Conv_2. In this set up the electrical cooling fan Conv_2 will act as a consumer in the electrical energy market and as a producer on the thermal energy market.

The unitary energy buffer price of an energy buffer is dependent on a number of energy buffer specific parameters. For embodiments of the inventive concept comprising an energy buffer in form of a battery the most influential parameter for setting a unitary energy buffer price is the current SoC of said battery. If the SoC of the battery EI_Eb_1 is high, the unitary energy buffer price will be low and if the SoC of the battery EI_Eb_1 is low, the unitary energy buffer price will be high. Hence, if the SoC of the battery EI_Eb_1 is low the battery EI_Eb_1 is more inclined to act as a consumer on the electrical energy market and if the SoC of the battery EI_Eb_1 is low the more likely is it that the battery EI_Eb_1 will act as a producer on the electrical energy market. This example is however first and foremost valid if no information concerning upcoming route is available. If e.g. it is known that the vehicle is travelling at reasonable speed and is approaching a longer downhill, which may enable SoC of a battery to be increased due to brake regeneration, it is possible to set a low unitary energy buffer price for the battery since the battery shortly can be recharged.

The specific parameters are important for setting the unitary energy buffer price for respective energy buffer, and there are also many other specific parameters that can be used when determining the supply-price function and the demand-price function of energy buffers. The specific parameters may e.g. comprise parameters affecting the continuously ongoing indirect discharge of the battery or the wear of the battery, such as ambient temperature and battery cell temperature, or may comprise route specific parameters such as distance to destination. This is not part of the invention per se and is thoroughly disclosed in prior art.

The supply-price function and demand-price function of an energy buffer are determined in a similar way as the demand-price function and supply-price function of converters.

The energy buffer supply-price function is determined according to:

$$p\_supply(Q\_out) = p\_buffer / eta\_marg\_buffer\_discharge(Q\_out),$$

where p_supply(Q_out) is the power dependent Q_out unitary energy price of power supplied by the energy buffer, i.e. the energy buffer supply-price function, p_buffer is the unitary energy buffer price and eta_marg_buffer_discharge (Q_out) is the marginal efficiency of the energy buffer when being discharged.

The energy buffer demand-price function is determined according to:

$$p\_demand(Q\_out) = p\_buffer * eta\_marg\_buffer\_charge(Q\_out),$$

where p_demand(Q_out) is the power dependent Q_out unitary energy price of power demanded by the energy buffer, i.e. the buffer demand-price function, p_buffer is the unitary energy buffer price and eta_marg_buffer_charge (Q_out) is the marginal efficiency of the energy buffer when being charged.

The marginal efficiency of an energy buffer can be calculated as:

$$d(Q\_out)/d(Q\_out + Q\_losses)(Q\_out),$$

where Q_out is the power supplied to the energy buffer when charged (or power discharged from the energy buffer when discharged) and QJosses is the power losses within the energy buffer, for example due to the internal resistance of a battery.

Further, the electrical energy system El_1 comprises the consumer El_Cons_1. In the embodiment shown in FIG. 1b the consumer EI_Cons_1 comprises the aggregated energy demand of lamps and ECUs. Since the ECU manages many of the functionalities of the vehicle it is essential that the ECU continuously is provided with the amount of electrical power required by the ECU during operation. Also lamps are examples of consumers that require a fix amount of power to be activated and/or stay active. This will be disclosed more in detail in the description of FIG. 2b.

The thermal energy market works in the same way as the other energy markets. As disclosed above, the electrical cooling fan Conv_2 is connected to the thermal energy buffer Th_Eb_1. The possibility of a thermal energy buffer to either work as a producer, by providing thermal power, or as a consumer, by buffering thermal power, is dependent on the present temperature of the buffering media of the thermal energy buffer Th_Eb_1 and if cooling or heating is requested. The unitary energy buffer price of the thermal energy buffer Th_Eb_1 may e.g. be dependent on the current temperature of the thermal energy buffer Th_Eb_1 in relation to a highest or lowest allowed temperature of respective thermal energy subsystem cooling media, such as e.g. the top tank temperature, the highest allowed cooling water temperature of an engine cooling system.

What engine devices that are present, and how these devices are connected, in the exemplary embodiment of an energy system ES_1 of FIG. 1b is just for clarification purposes and should not be seen as limiting for the invention.

Figure 2A:
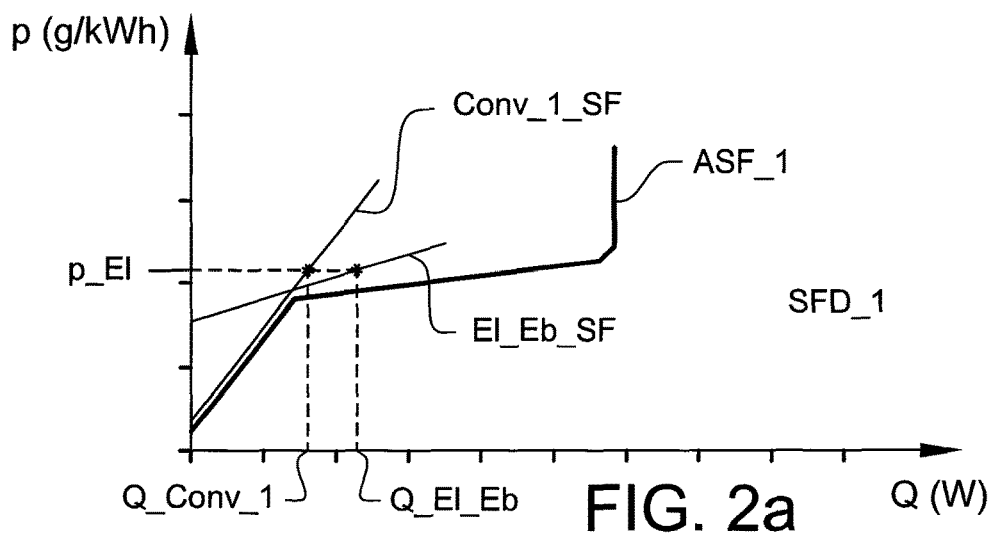
FIG. 2a, FIG. 2b and FIG. 2c show an aggregated supply-price function, an aggregated demand-price function and an aggregated supply-demand function for the electrical energy market of the energy system of FIG. 1b.
Figure 2B:
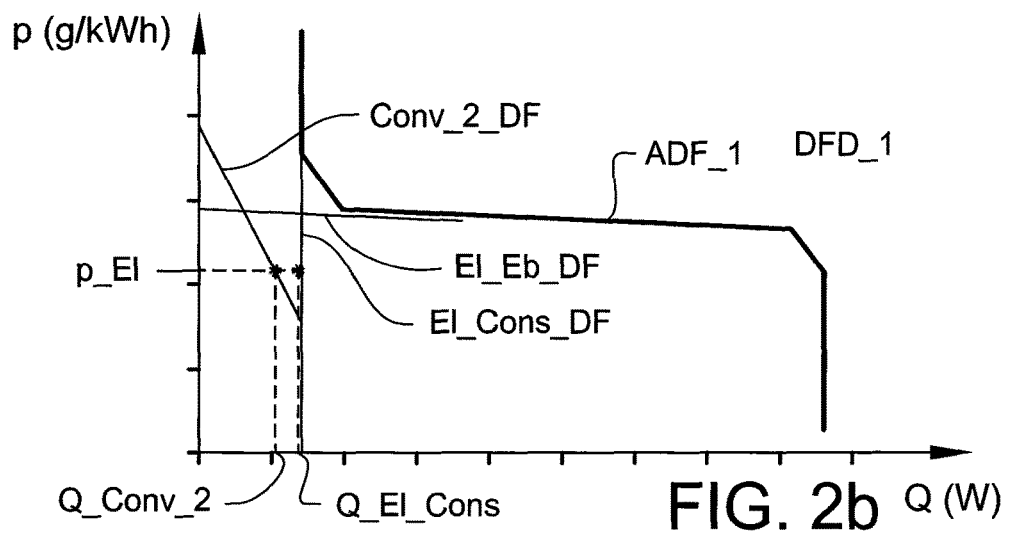
Figure 2C:
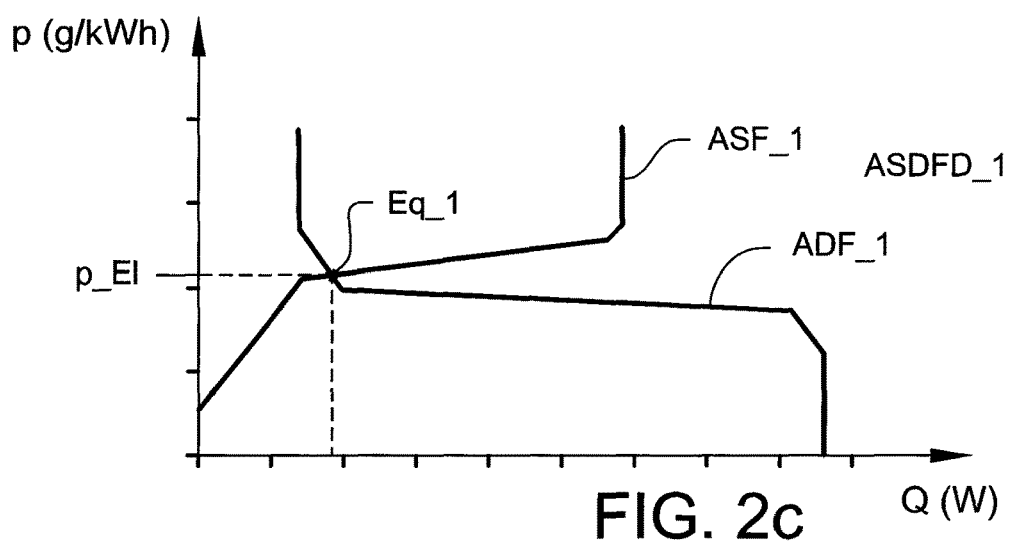

Referring now to FIGS. 2a, 2b and 2c, showing a supply-price function diagram SFD_1 in FIG. 2a, a demand-price function diagram DFD_1 in FIG. 2b and an aggregated supply-demand function diagram ASDFD_1 in FIG. 2c for the electrical energy market of the electrical energy system of FIG. 1b. All shown diagrams SFD_1; DFD_1; ASDFD_1 are schematic examples of how supply-price function diagrams SFD_1, demand-price function diagrams DFD_1 or supply-demand function diagram ASDFD_1 for the embodiment shown in FIG. 1b can look like.

The supply-price functions referring to the embodiment shown in FIG. 1b are determined from the respective fuel injection rate that is needed to produce the range of power respective producer can provide. Correspondingly, a demand-price function is determined from the marginal benefits the consumer gets by consuming power.

As has been stated previously, the inventive concept is continuous, meaning that the operations performed according to the inventive concept are repeated according to a predefined time sample interval t+n. Said supply-price functions and said demand-price functions of producers and consumers respectively are recalculated according to said time sample interval t+n. As also has been stated previously the supply-price function and/or the demand-price function of respective producer and/or consumer are dependent on a number of specific parameters. When calculating said supply-price functions and said demand-price functions of said producers and/or consumers for the time t+n these parameters are taken at the time t. Hence, the setting of respective unitary energy price, which can be obtained from respective supply-price function and/or respective demand-price function, is repeated at the time sample interval t+n.

Further, in order to calculate the supply-price functions and/or the demand-price functions for producers and controllable consumers respectively the marginal efficiency for each respective producers and controllable consumer at the time t is needed. A converter acting as a consumer is an example of a controllable consumer.

The supply-price function for a producer is calculated according to:

$$p\_power\_out(Q\_power\_out) = \frac{p\_power\_in}{Prod\_eta\_marg(Q\_power\_out)}$$

where Prod_eta_marg(Q1_power_out) is the marginal efficiency of the producer and p_power_in is the unitary energy price of the power consumed. p_power_out(Q_power_out) is the unitary energy price of the produced power. For a converter the produced power is the form of energy that the converter has converted energy to, for a producer, e.g. in the form of a lamp, the produced power is the form of light.

The demand-price functions for controllable consumers are determined by multiplying the marginal efficiency of the controllable consumer with the unitary energy price of the subsystem of the consumer according to:

$$p\_power\_in = p\_power\_out * Cons\_eta\_marg$$

where Cons_eta_marg is the marginal efficiency of the consumer, i.e. the marginal benefit from consuming, p_power_in is the unitary energy price of the subsystem and p_power_out the unitary energy price of the power which can be benefited from.

The supply-price functions and the demand-price functions are limited in quantity depending of minimum and maximum power that can be provided by or benefited from of respective producer, consumer or converter.

In this context it is also important to remember that e.g. converters and energy buffers can act as both producers and consumers. A converter always acts as consumer in one energy subsystem and as producer in another energy subsystem, whereas an energy buffer preferably works as either producer or consumer at a given time.

Also, for uncontrollable consumers, which will be disclosed more in detail in connection to FIG. 2b, the demand-price function will be in form of a scalar. The uncontrollable consumers have a marginal efficiency as well, but since they are not possible to control and the amount of energy required by such consumers is fixed. Such uncontrollable consumers are independent of the unitary energy price.

Now looking at the diagrams of FIGS. 2a, 2b and 2c. FIG. 2a shows supply-price functions Conv_1_SF; EI_Eb_SF and an aggregated supply-price function ASF_1 of the embodiment of the energy system shown in FIG. 1b. FIG. 2b shows demand-price functions Conv_2_DF; EI_Eb_DF; El_Cons_DF and an aggregated demand-price function ADF_1 of the embodiment of the energy system shown in FIG. 1b. Finally, FIG. 2c shows the aggregated supply-price function ASF_1 and the aggregated demand-price function ADF_1. In accordance with this embodiment of FIG. 1b where the only primary energy source is a combustion engine, the x-axis of the diagrams SFD_1; DFD_1; ASDFD_1 shows the quantity of energy, specified in W (watt), and the y-axis shows the price specified in g/kWh.

Normally, the marginal efficiency of a producer decreases with increased power outtake. This means that the price for power provided from such a producer will increase with quantity. This is shown in the supply-price function diagram SFD_1 in that the supply-price function Conv_1_SF; EI_Eb_SF of respective producer is slightly inclined. FIG. 2a discloses that the inclination of the supply-price function Conv_1_SF for the alternator is steeper than the inclination of the supply-price function EI_Eb_SF of the battery. From this specific example it can be concluded that the marginal efficiency of the given alternator decreases more with power outtake than the marginal efficiency of the battery. It should also be noted that the supply-price function Conv_1_SF; EI_Eb_SF of respective energy producer discloses the minimum and maximum quantity of power that can be provided from respective energy producer.

The first supply-price function Conv_1_SF and the second supply-price function EI_Eb_SF are aggregated into an aggregated supply-price function ASF_1. The aggregated supply-price function ASF_1 is obtained by adding the respective power quantity contribution of respective supply-price function Conv_1_SF; EI_Eb_SF into an aggregated supply-price function ASF_1. The addition is performed by adding the energy quantity contribution from respective producer in x-direction. Hence, for every added supply-price function the aggregated supply-price function will be offset towards higher quantities of energy.

The demand-price function diagram DFD_1 is obtained in corresponding manner, with the exception that instead of energy producers the demand-price function diagram DFD_1 discloses demand-price functions Conv_2_DF; EI_Eb_DF; El_Cons_DF for energy consumers, and an aggregated demand-price function ADF_1, wherein respective demand-price function expresses respectively required quantity of power at a unitary energy price. Controllable energy consumers can e.g. be energy converters, converting one form of energy into another form of energy. In some embodiment can also energy buffers be considered to be controllable energy consumers.

In FIG. 2b the demand-price functions of the three energy consumers provided in the electrical power subsystem of the embodiment of FIG. 1b are shown; the demand-price function of an electrical cooling fan Conv_2_DF, of a consumer in form of lamps and ECUs El_Cons_DF and of a battery EI_Eb_DF. In corresponding way as for the energy producers the marginal efficiency or marginal benefit of respective energy consumers is considered when determining respective demand-price function Conv_2_DF; EI_Eb_DF; El_Cons_DF. However, for energy consumers the marginal efficiency generally decreases with increased load, which is shown in that the demand-price function Conv_2_DF; EI_Eb_DF; El_Cons_DF of respective energy consumer will have the opposite appearance than supply-price functions Conv_1_SF; El_Eb_SF.

Many consumers, such as e.g. consumers associated with basic and essential vehicle functionality as e.g. ECUs and brake systems are not controllable. Their activation and deactivation respectively, or the duration during which such non controllable consumers are active or inactive may be completely out of control from the driver. The respective power consumption of such consumers is a non controllable electrical load, which means that such consumers are price independent. This shows in that the demand-price functions of such consumers are represented by vertical scalars positioned in the demand-price function diagram at the quantity of power respective functionality requires.

Such consumers comprise all essential vehicle functionality and constitutes the basic electrical load of the vehicle. With reference to the demand-price functionality diagram DFD_1 of FIG. 2b, all such consumers offsets the aggregated demand-price functionality ADF_1 towards higher quantity of power, thus to the right in the demand-price functionality diagram DFD_1, with a magnitude corresponding to the required power for each such consumer.

In FIG. 2b the demand-price function El_Cons_DF represents such a consumer, wherein said consumer comprises the aggregated consumption of power of lamps and ECUs.

The demand-price functions Conv_2_DF; El_Eb_DF; El_Cons_DF are aggregated into an aggregated demand-price function ADF_1.

The aggregated supply-price function ASF_1 from FIG. 2a and the aggregated demand-price function ADF_1 from FIG. 2b are compared in the aggregated supply-demand function diagram ASDFD_1 (see FIG. 2c). The aggregated supply-price function ASF_1 and the aggregated demand-price function ADF_1 of the electrical energy subsystem coincides at a point Eq_1, wherein the point Eq_1 indicates where the electrical energy subsystem is in energy balance. The quantity of power where there is energy balance gives the unitary energy market price P_El for electrical energy of said electrical energy subsystem. In the point Eq_1 said energy supply and said energy demand of the electrical energy subsystem of FIG. 2b is equal.

The unitary energy market price p_El is subsequently fed back to the supply-price function diagram SFD_1 of FIG. 2a and the demand-price function diagram DFD_1 of FIG. 2b. The producers and consumers of the electrical energy subsystem should produce or consume the quantity of power respective producer and consumer produces or consumes at the determined unitary energy market price p_El.

Looking at the supply-price function Conv_1_SF of FIG. 2a for the alternator converter at the unitary energy market price p_El it can be concluded that the alternator converter should provide the power quantity Q1_Conv_1 to the electric energy subsystem. Thus the converter acts as a producer in the electrical energy subsystem. From the supply-price function El_Eb_SF for the battery at the unitary energy market price p_El it can be concluded that the battery, also acting as a producer according to the embodiment shown in FIG. 2a, should provide the power quantity Q_El_Eb to the electric energy subsystem.

From FIG. 2b can be concluded that at the unitary energy price p_El for electrical power in the electrical energy subsystem the electrical cooling fan, represented by the demand-price function Conv_2_DF, is provided with a power quantity of Q_Conv_2, The demand-price function for the price independents ECUs and lamps El_Cons_DF indicates that the ECUs and lamps are provided with the set power quantity Q_El_Cons. The demand-price function for the battery El_Eb_DF indicates that at p_El the battery is not provided with any power. This is visualised in the supply-price function diagram DFD_1 by that the demand-price function El_Eb_DF of the battery is positioned above the unitary energy price p_El of the electrical energy subsystem.

By using the inventive concept it is possible to distribute the energy management of the energy system to only comprise energy management of smaller, less complex subsystems. Also, by using the inventive concept new vehicle components or even new subsystems can be added to or removed from the energy system without having to retune the complete energy management system.

Referring now to FIG. 3 and FIGS. 4a, 4b and 4c. Even though the embodiment shown in FIG. 3 also is a significantly simplified schematic view of an energy system ES_2 it is intended to highlight the complexity added with each energy subsystem Me; El_2; Th_1; Pn; Th_2; Th_3 and how the activity within respective energy subsystems Me; El_2; Th_1; Pn; Th_2; Th_3 affect the other energy subsystems Me; El_2; Th_1; Pn; Th_2; Th_3.

Figure 3:
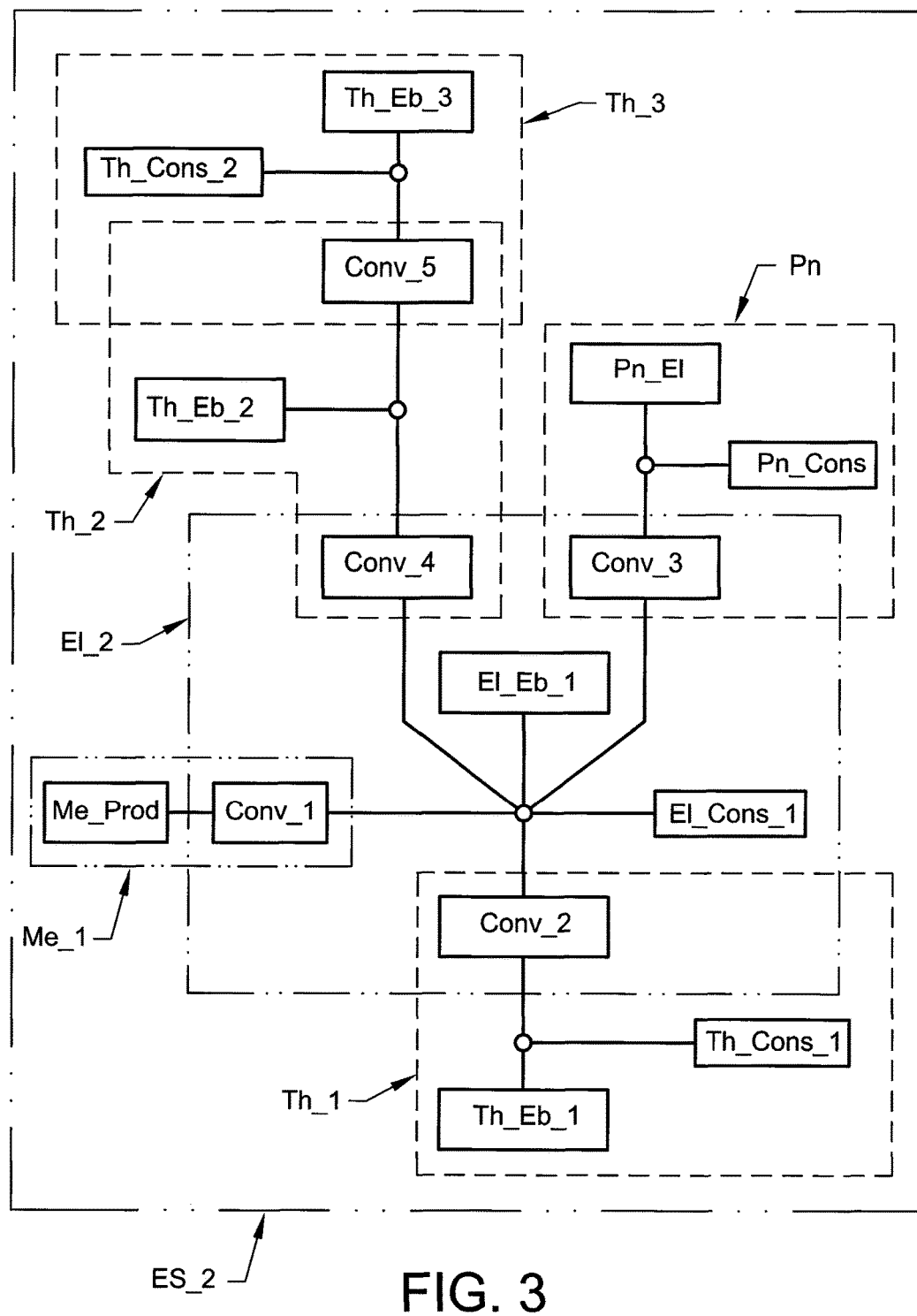
FIG. 3 shows a schematic view of a more complex energy system.

FIG. 3, shows a schematic view of an embodiment of an energy system ES_2 comprising a more complex electric energy subsystem El_2. According to of the embodiment of the energy system ES_2 shown in FIG. 3 the electrical energy subsystem El_2 is connected to a thermal energy subsystem Th_1 via a converter Conv_2 in form of a cooling fan and to a mechanical energy subsystem Me via a converter Conv_1 in form of an alternator. The thermal energy subsystem Th_1 additionally comprises an energy buffer Th_Eb_1 in form of a thermal energy buffer and a consumer Th_Cons_1 in form of a retarder. The mechanical energy subsystem Me comprises a producer Me_Prod in form of a combustion engine. In accordance with the embodiment of FIG. 1b the electrical energy subsystem El_2 additionally comprises an energy buffer El_Eb_1 in form of a battery and a consumer El_Cons_1 representing ECUs and lamps. The electric energy subsystem El_2 is also connected to A/C energy subsystem Th_2 via a converter Conv_4 in form of an air conditioner. The A/C energy subsystem Th_2 comprises an energy buffer Th_Eb_2 in form of temperature or pressure of an evaporator and the A/C energy subsystem Th_2 is in turn connected to a cabin cool energy subsystem Th_3 via a converter Conv_5, wherein the converter is in form of a cabin fan. In the schematic example shown in FIG. 3 the cabin cool energy subsystem Th_3 additionally comprises an energy buffer Th_Eb_3 in form of a climate comfort energy buffer and a consumer Th_Cons_2 in form of ambient temperature. Further, the electric energy subsystem El_2 is connected to a pneumatic energy subsystem Pn via a converter Conv_3 in form of an air compressor. The pneumatic energy subsystem Pn additionally comprises an energy buffer Pn_Eb in form of the pressure of an air tank and a consumer Pn_Cons in form of brakes and suspension.

What engine devices, and how these devices are connected, in the exemplary embodiment of an energy system ES_2 of FIG. 3 is just an example provided to highlight the increased complexity of the inventive concept and the systems controlled by the inventive concept. The embodiment shown in FIG. 3 is not to be seen as limiting for the invention. Hence, how the different devices of the energy subsystem are connected should not be seen as limiting. They are provided for clarification purposes and in reality respective engine components may be connected to each other in other ways.

Figure 4A:
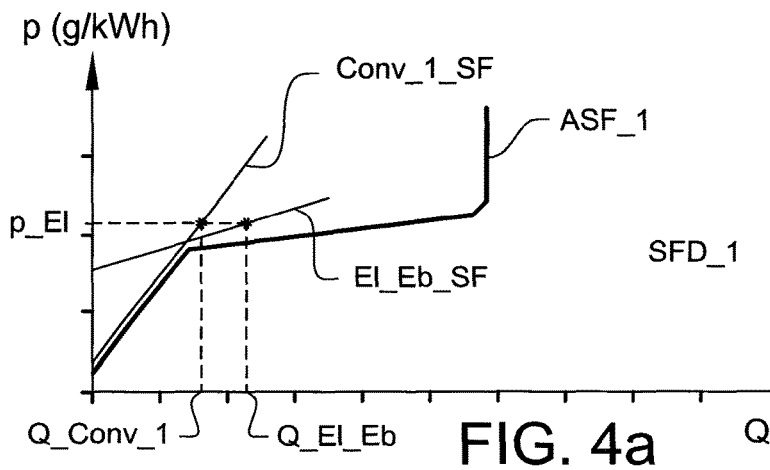
FIG. 4a, FIG. 4b and FIG. 4c show an aggregated supply-price function, an aggregated demand-price function and an aggregated supply-demand function for the electrical energy market of the energy system of the more complex energy system of FIG. 3.
Figure 4B:
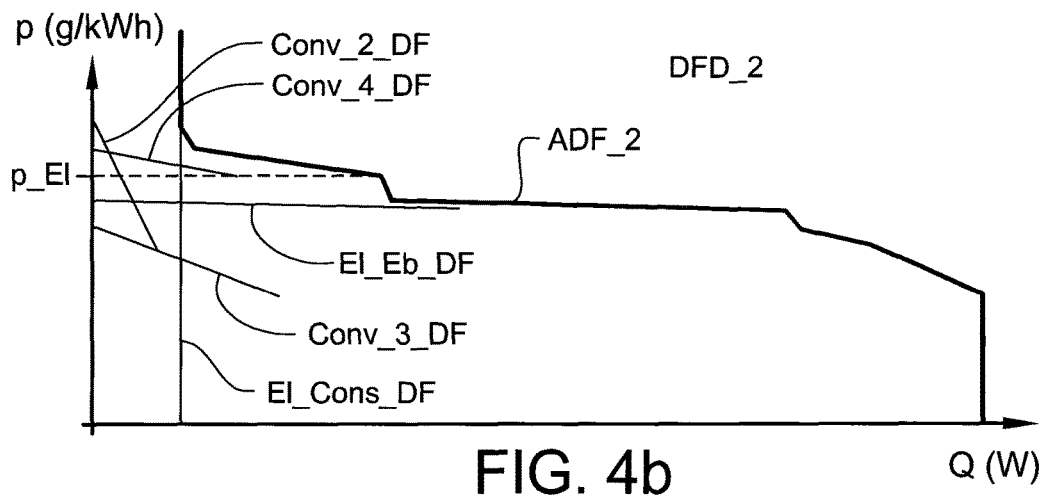
Figure 4C:
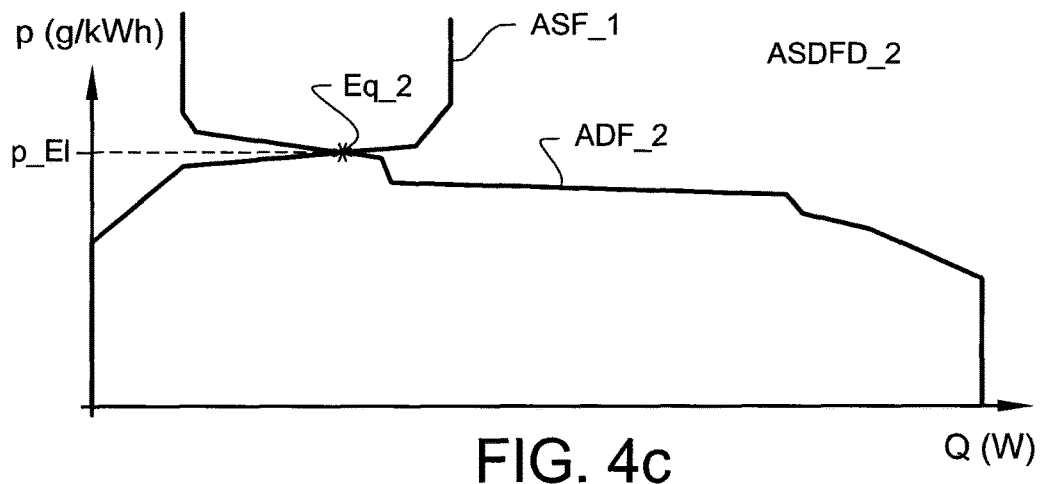

Referring now to FIGS. 4a, 4b and 4c, showing a supply-price functions diagrams SFD_1, a demand price function diagram DFD_2 and an aggregated supply-demand function diagram ASDFD_2 of the electric energy subsystem according to the embodiment shown in FIG. 3. FIG. 4a shows an supply-price function diagram SFD_1 with a supply-price function Conv_1_SF representing an alternator, a supply-price function El_Eb_SF representing a battery and an aggregated supply-price function ASF_1 in which the two supply-price functions Conv_1_SF; El_Eb_SF are aggregated in accordance to what has been previously described.

FIG. 4b shows demand-price function diagram DFD_2 with a number of demand-price functions; Conv_4_DF representing an A/C, Conv_2_DF representing an electrical cooling fan, El_Eb_DF representing a battery, Conv_3_DF representing an air compressor and El_Cons_DF, representing ECUs and lamps. An aggregated demand-price function ADF_2 of the demand-price functions Conv_4_DF; Conv_2_DF; El_Eb_DF; Conv_3_DF; El_Cons_DF are also shown. The supply- and demand-price functions Conv_1_SF; El_Eb_SF; Conv_4_DF; Conv_2_DF; El_E- b_DF; Conv_3_DF; EI_Cons_DF and the aggregated functions ASF_1; ADF_2; ASDFD_2 are obtained according to what has been described when referring to FIGS. 2a, 2b and 2c.

As can be seen, the supply-price function diagram SFD_1 of FIG. 4a is the same as the supply-price function diagram SFD_1 of FIG. 2a. However, the demand-price function diagram DFD_2 of FIG. 4b is far more complex than corresponding demand-price function diagram DFD_1 of FIG. 2b. This is due to the increased complexity of the energy system shown in FIG. 3.

In a real application the energy systems are much more complex. By applying the inventive concept it is possible to transfer the problem of how to optimize energy consumption within the complete energy system to the problem of minimizing the energy cost for each subsystem which eliminates the need for a global optimization algorithm.

Figure 5:
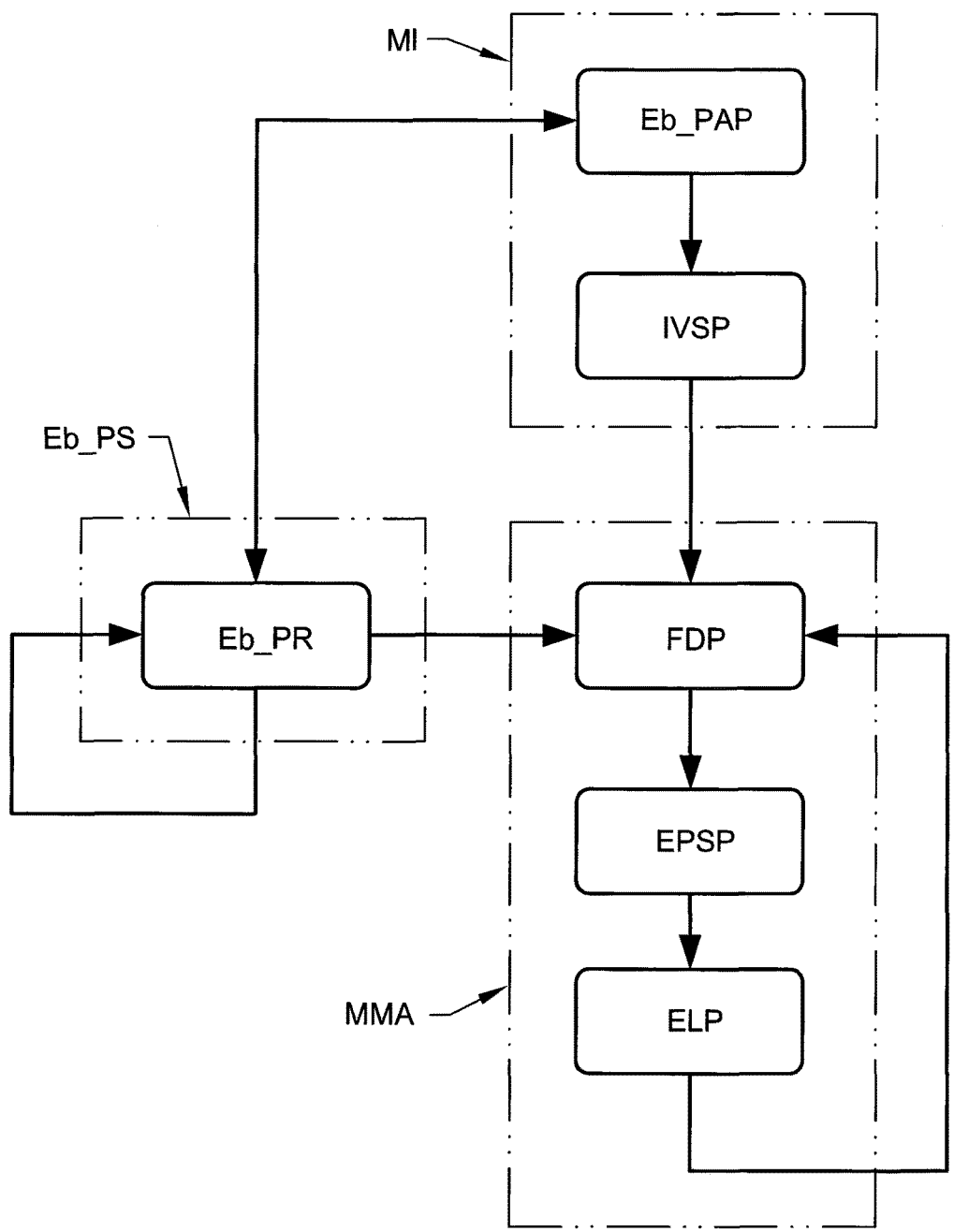
FIG. 5 shows a schematic flowchart of an embodiment of the inventive concept.

Finally, FIG. 5 shows a schematic flowchart of an embodiment of the inventive concept where some the most significant method steps are highlighted. The embodiment of the inventive concept shown in FIG. 5 is applied for an energy system comprising an energy buffer. According to the embodiment shown in FIG. 5 the method can be divided in three main activities; method initiation M1, method main activity MMA and unitary energy buffer price setting Eb_PS.

The unitary energy buffer price setting Eb_PS is performed by a continuously running a unitary energy buffer price recalculation and updating process Eb_PR. The unitary energy buffer price is dependent on a number of energy buffer specific parameters such as e.g. current amount of energy stored in the energy buffer. The unitary energy buffer price recalculation and updating process Eb_PR is preferably done according to a second sample frequency S2. According to a preferred embodiment of the inventive concept the unitary energy buffer price may be saved at the termination of the inventive concept.

The method initiation M1 is performed when the method is initiated after the vehicle has been turned off. In the shown embodiment of the inventive concept the method initiation M1 is initiated by that an engine management system, preferably an ECU, acquires the latest unitary energy buffer price according to a unitary energy buffer price acquiring process Eb_PAP. This may be a unitary energy buffer price saved at previous termination of the inventive concept Eb_PR. The acquired unitary energy buffer price is set as initial unitary energy price of respective energy subsystem at the time t in an initial value setting process IVSP. Thus, the unitary energy buffer price will be the initially set unitary energy price of the energy subsystem at the time t.

Using the unitary energy buffer price as initial value of the unitary energy price of said energy subsystem has the advantage that since the energy balance of the energy buffer is significant for the complete energy balance of the energy subsystem, thus the unitary energy buffer price is significant when determining the unitary energy price of said energy subsystem comprising said energy buffer, the initial unitary energy price of the energy subsystem will be reasonably accurate without having to perform any complex calculations.

The set unitary energy price is subsequently fed to the first process of the method main activity MMA, which is a determination of supply- and demand-price functions process FDP. The method main activity MMA is preferably performed according to a first sample frequency SI. The first sample frequency SI may be longer than the second sample frequency S2, thus the method main activity MMA may be performed more frequently than the unitary energy buffer price setting Eb_PS.

As described above, according to the embodiment shown in FIG. 5, for the first sample, when the inventive concept is initiated at method initiation M1, at the time t the unitary energy buffer price from the unitary energy buffer price recalculation and updating process Eb_PR are used as unitary energy price of the energy subsystem. The determination of supply- and demand-price functions process FDP uses these values, acquired at the time t, and other relevant specific parameters acquired at the time t, to determine the supply-price functions and demand-price functions of respective energy subsystem at the time t+n, where n is the length of the sample. The determined supply-price functions and demand-price functions are subsequently used to determine the unitary energy price of respective energy subsystem at the time t+n in a unitary energy price setting process EPSP. In the last step of the method main activity MMA the determined unitary energy prices of respective energy subsystem are used to determine if and to what extent energy from one energy subsystem should be provided to another energy subsystem in an energy conversion process ECP. In the energy conversion process ECP the determined unitary energy price, for the time t+n, for respective energy subsystem is used to determine possible power transfers as described in the description. The transfer and conversion of power of one energy form from one energy subsystem to power of another energy form of another energy subsystem is performed by the common converter of said energy subsystems.

The determined unitary energy price at the time t+n of respective energy subsystem, as well as other possible specific parameters, will subsequently be feed back to the determination of supply- and demand-price functions process FDP of the method main activity MMA.

Once the method is initiated the method main activity MMA and the unitary energy buffer price setting Eb_PS are performed continuously. The method main activity MMA is preferably performed according to the sample frequency SI and the unitary energy buffer price setting Eb_PS preferably according to the sample frequency S2. When the method is running the unitary energy buffer price recalculation and updating process Eb_PR will continuously provide the supply- and demand-price functions process FDP with updated unitary energy buffer prices according to the sample frequency S2.

Figure 6:
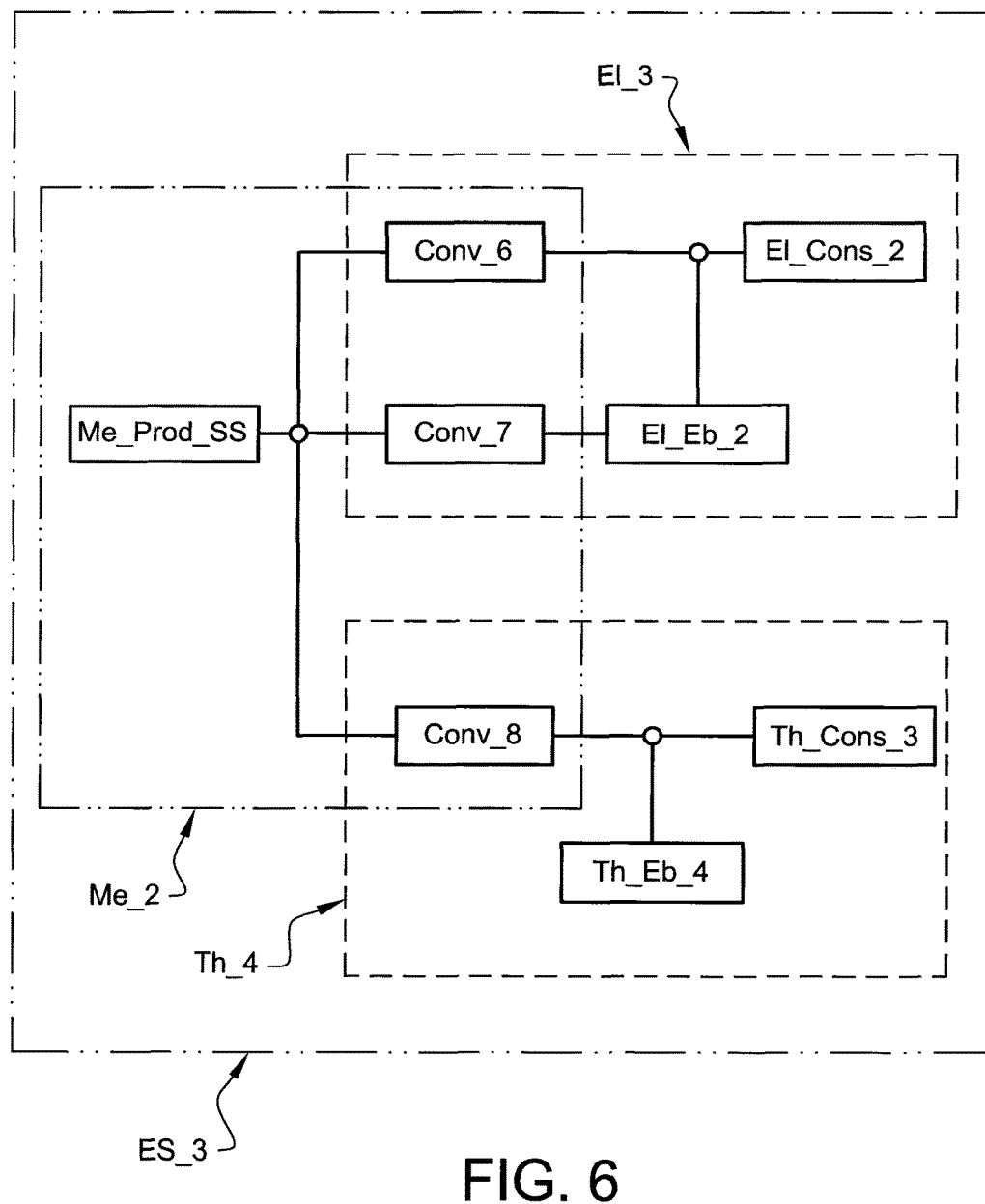
FIG. 6 shows a schematic view of an embodiment of an energy system for which an embodiment of the inventive concept can be applied.

FIG. 6 shows a schematic view of another embodiment of a significantly simplified energy system ES_3. According to the embodiment of the inventive concept shown in FIG. 6 the inventive concept for managing energy flows within an energy system of a vehicle is used to control the switching between two discrete states of the vehicle. Further, the switching between two discrete states is used to add a start-stop functionality. Even though this aspect of the inventive concept is described by reference to FIG. 6, this aspect of the inventive concept can also be applied to the exemplifying embodiments of energy systems as shown in FIGS. 1b and 3.

In the embodiment shown the energy system ES_3 comprises three energy subsystems; a mechanical energy subsystem Me_2, an electrical energy subsystem El_3 and a thermal energy subsystem Th_4.

The mechanical energy subsystem Me_2 comprises a mechanical energy producer, Me_Prod_SS, according to the embodiment shown in FIG. 6 in form of a combustion engine provided with start-stop functionality. The mechanical energy producer Me_Prod_SS in form of a combustion engine provided with start-stop functionality is hereafter referred to as simply the combustion engine. The combustion engine is preferably running on a fuel such as diesel. Further, the mechanical energy subsystem comprises a first converter Conv_6, a second converter Conv_7 and a third converter Conv_8, for converting energy.

The first and third converters Conv_6; Conv_8 and the combustion engine are connected such that mechanical power can be provided from the combustion engine to the converters Conv_6; Conv_8. The second converter Conv_7 is provided such that the second converter Conv_7 can provide with electrical energy from the an energy buffer El_Eb_2 of the electrical energy subsystem El_3, and such that the electrical power can be converted by the second converter Conv_7 to mechanical power which can be provided to the combustion engine. In the embodiment of FIG. 6 the second converter is a starter engine, wherein the mechanical power provided to the combustion engine is used to start the combustion engine after it has been turned off. The first converter Conv_6 can preferably be an alternator and the third converter Conv_8 can preferably be a cooling fan.

The electrical energy subsystem El_3 shares the second and first converters Conv_6; Conv_7 with mechanical energy subsystem Me_2 and additionally comprises an electrical consumer El_Cons_2 and the energy buffer El_Eb_2. The first and second converters Conv_6; Conv_7, the electrical consumer El_Cons_2 and the electrical energy buffer El_Eb_2 are connected such that electrical power can be provided between the different components Conv_6; Conv_7; El_Eb_2; El_Cons_2 of the electrical energy subsystem El_3. The electrical consumer El_Cons_2 can preferably be in form of lamps and ECUs and the buffer El_Eb_2 can preferably be in form of a battery.

The thermal energy subsystem Th_4 shares the third converter Conv_8 with the mechanical energy subsystem Me_2 and additionally the thermal energy subsystem Th_4 comprises a thermal consumer Th_Cons_3, preferably in form of a retarder, and a thermal energy buffer Th_Eb_4. The third converter Conv_8, the thermal energy buffer Th_Eb_4 and the thermal consumer Th_Cons_3 are connected such that thermal power can be provided between the different components Conv_8; Th_Eb_4; Th_Cons_3 of the thermal energy subsystem Th_4. The first and third converters Conv_6; Conv_8 converts mechanical power produced by the combustion engine to energy of the energy form of respective energy subsystem El_3; Th_4, and the second converter Conv_7 converts electrical energy from the electrical energy subsystem El_3 to mechanical power.

During normal operation, meaning when the vehicle is driving under normal conditions, the combustion engine continuously converts energy chemically stored in the fuel to mechanical energy. This mechanical energy is primarily used for the propulsion of the vehicle, but the mechanical energy is also used to provide the energy subsystems El_3; Th_4, which are connected to the mechanical energy subsystem Me_2 by converters Conv_6; Conv_8, with mechanical energy such that the converters Conv_6; Conv_8 can provide energy to respective energy consumer El_Cons_2; El_Eb_2; Th_Cons_3; Th_Eb_4 of respective energy subsystem El_3; Th_4.

By referring to the embodiment shown in FIG. 6 this may be exemplified by that the converter Conv_6 in form of an alternator, connecting the mechanical energy subsystem Me_2 with the electrical energy subsystem El_3, convert mechanical energy generated by the mechanical energy producer Me_Prod_SS, in form of a combustion engine provided with start-stop functionality, such that the converter Conv_6 can provide electrical energy to the electrical consumer El_Cons_2 in form of lamps and ECUs.

During vehicle operation the lamps and ECUs continuously needs to be provided with electrical energy in order to work properly. Thus, if the combustion engine is turned off the lamps and ECUs needs to be provided with electrical energy from elsewhere, preferably the energy buffer El_Eb_2 in form of a battery. For how long time the battery is able to provide electrical energy to lamps and ECUs is dependent on the current state of charge, SoC, of the battery. Thus, if the lamps and ECUs are dependent on electrical power from the battery the level of energy stored in the battery will decrease and eventually the SoC will sink below a predetermined threshold value. According to the inventive concept this will trigger that the combustion engine will be started in order to provide mechanical energy, converted by the alternator from mechanical energy to electrical energy, from the mechanical energy subsystem Me_2 to the electrical energy subsystem El_3, such that the lamps and ECUs, and preferably also the battery, can be provided with energy originating from the combustion engine. If more electrical energy than is required from the lamps and ECUs is provided to the electrical energy subsystem El_3 by the combustion engine the surplus of electrical energy can be used to recharge the battery.

The start up of the combustion engine is performed by the second converter Conv_7, which as stated according to the embodiment shown in FIG. 6 is a starter engine. The starter engine requires electrical power from the battery in order to facilitate the combustion engine start up. Hence, the predetermined threshold value referred to above is preferably set in order to ensure that the SoC of the battery is sufficient for providing the starter engine with enough energy for starting the combustion engine.

The example disclosed above is significantly simplified and is merely disclosed in order to highlight the basic principle of this embodiment of the inventive concept. According to this embodiment there are a number of auxiliary systems of the energy subsystems that are provided with energy from the combustion engine as long as the combustion engine is running. If the combustion engine is turned off, these auxiliary systems need to be provided with energy from elsewhere, e.g. with energy stored in energy buffers. The energy stored in energy buffers is limited and at some point this may force the combustion engine to be turned back on.

Figure 7:
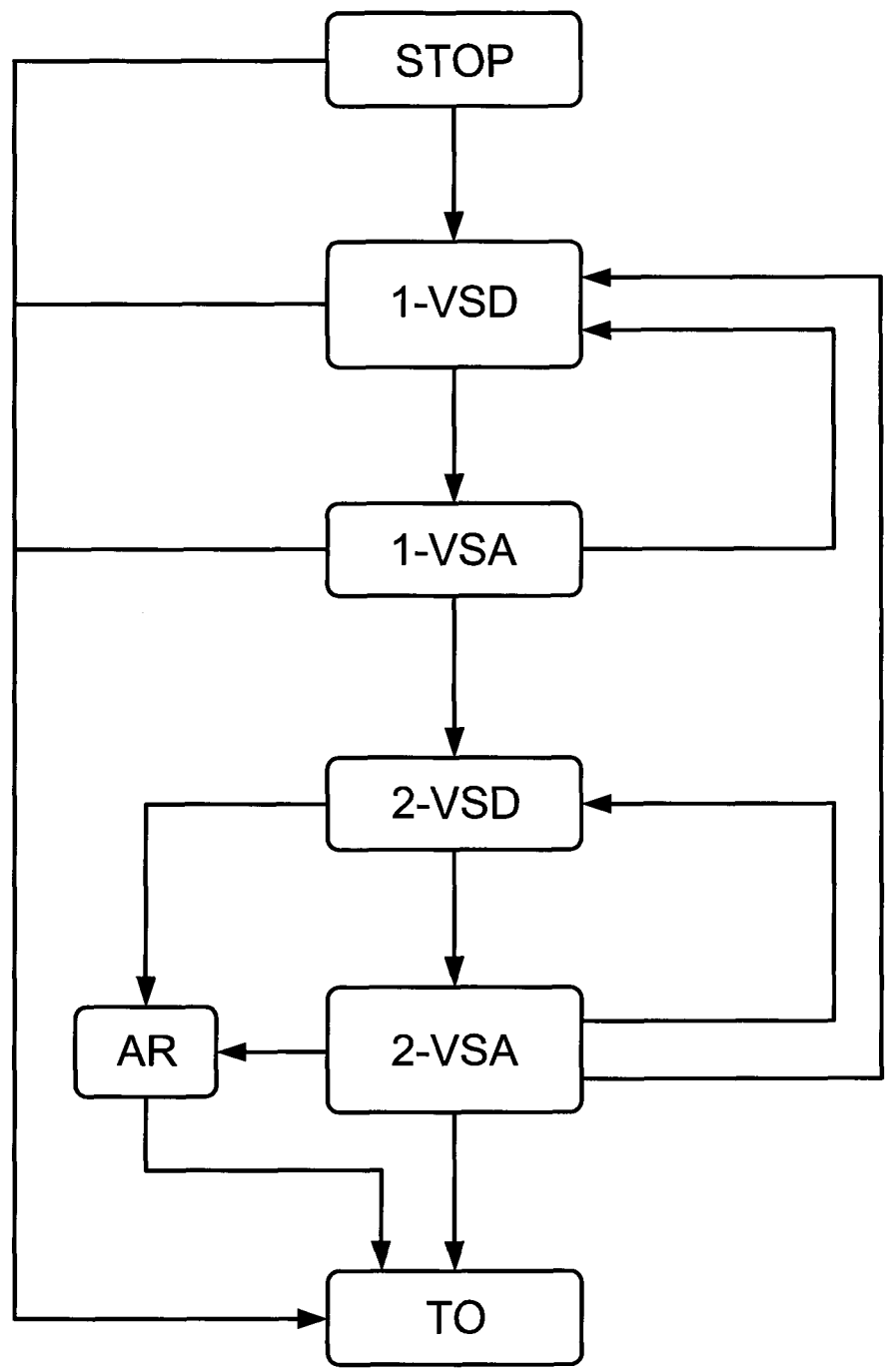
FIG. 7 shows a schematic flowchart of another embodiment of the inventive concept.

In simple terms, according to the embodiment shown in FIG. 6 this will show in that as the SoC of the battery decreases the price for electrical power from the battery will increase to be high enough to make it more cost efficient to turn the combustion engine back on. Referring now to FIG. 7, disclosing a schematic flowchart of an embodiment of the inventive concept wherein by controlling energy flows within an energy system the switching between two discrete states of a vehicle can be executed. In the embodiment shown in FIG. 7 these two discrete states are a first state where a combustion engine provided with start-stop functionality, hereafter referred to as the combustion engine, of the vehicle is running and a second state where the combustion engine is turned off. The method is executed according to a sample frequency S3. S3 may be equal to or different from the other sample frequencies SI or S2.

This embodiment of the inventive concept comprising start-stop functionality is intended to be implemented when the vehicle temporarily stops, e.g. such as when stopping at a red light, or if the vehicle is a distribution vehicle, such as at reoccurring delivery stops. Hence, this embodiment of the inventive concept is initiated by that the vehicle stops STOP. When the vehicle stops the combustion engine is still running, enabling instant acceleration if take off TO instantly is requested by a driver.

At any given time a number n of energy subsystems together require a specific amount of mechanical energy, from the combustion engine, in order to provide the auxiliary systems of said n energy subsystems with electrical energy. Running the combustion engine in order to generate at least the specific amount of energy generates a specific cost. If that n energy subsystems instead where provided with electrical energy originating from elsewhere within the energy system, such as from energy buffer of respective n energy subsystems, this would generate another specific cost. The general principle behind this embodiment of the inventive concept is that these two states are evaluated against each other. In this case the different states between which the inventive concept controls the switch is a state where a combustion engine is running and a state where the combustion engine is turned off.

When the vehicle stops a first vehicle status determination operation 1-VSD function of the inventive concept, comprising start-stop functionality, calculates the momentary cost for keeping the engine running C_Eng_on and the predicted cost n(C_ESS) for the energy momentarily consumed in a number n of energy subsystem provided with mechanical energy from the combustion engine.

The momentary cost for keeping the engine running C_Eng_on is calculated according to:

$$C\_Eng\_on = \text{fuel\_rate}(Q\_Eng\_on) \ [g/s],$$

where Q_Eng_n is the power the combustion engine momentarily delivers. This, fuel_rate(Q_Eng_on) is the amount of fuel that is required to deliver Q_Eng_on. C_Eng_on will consequently be specified in g/s.

Q_Eng_on can preferably be obtained by using the previously described Marshall Equilibrium Theory for determining what quantity of power a producer or converter, such as a combustion engine, provides at a determined unitary energy price.

According to this embodiment the unitary energy price of the mechanical energy subsystem comprising the combustion engine would be used to determine Q_Eng_n.

The predicted net cost n(C_ESS), which is the cost for the energy needed by respective energy subsystem if the combustion engine is turned off, for the n number of energy subsystems is calculated according to:

$$n(C\_ESS) = n(p\_ESS\_engine\_off * Q\_ConvESS) \ [g/s],$$

where p_ESS_engine_off is the price for energy within respective energy subsystem when the combustion engine is turned off and Q_ConvESS is the quantity of energy required from the mechanical energy subsystem of respective energy subsystem when the combustion engine is running. Hence, Q_ConvESS is the quantity of energy the common converter of the mechanical energy subsystem and respective energy subsystem converts from mechanical energy to the energy form of respective energy subsystem. This is but one possible approach how to calculate the predicted net cost, but also other approaches are possible. n(C_ESS) is specified in g/s.

Thus, n(C_ESS) expresses the cost for producing the power provided to respective energy subsystem if the combustion engine is turned off. Q_ConvESS can also preferably be obtained by using the previously described Marshall Equilibrium Theory.

During the first vehicle status determination operation 1-VSD also a cost for switching state of the vehicle C_SwEngState, in this embodiment implying switching from a state where the combustion engine is turned off to a state where the combustion engine is running, is calculated.

The cost for switching state of the vehicle C_SwEngState is dependent on what two discrete states of the vehicle that is switched between. If the two discrete states are two gears the cost for switching state of the vehicle may e.g. be dependent on the wear caused by changing gear. For the embodiment referred to above where the two discrete states of the vehicle a state where the combustion engine is turned on and a state where the combustion engine is turned off the cost for switching state of the vehicle C_SwEngState, as has been previously disclosed, can be calculated according to:

$$C\_SwEngState = Q\_starter\_engine * t\_start\_engine * (p\_el\_engine\_off / t\_pred\_engine\_off) \ [g/s],$$

where Q_starter_engine, specified in kW, is the mean effect of the starter engine used to start the combustion engine during the time it takes for the starter engine to start the combustion engine, referred to as t_start_engine, specified in s (seconds). p_el_engine_off is the price for electrical power when the combustion engine is turned off, specified in g/kWh, and t_pred_engine_off, also specified in s (seconds), is the predicted remaining time until vehicle take off. C_SwEngState is specified in g/s.

Subsequently, the momentary cost for keeping the engine running C_Eng_on is compared to the predicted cost for the energy subsystems n(C_ESS) and the cost for switching state of the vehicle C_SwEngState in a first vehicle switch assessment operation 1-VSA, wherein if:

$$C\_Eng\_on \leq n(C\_ESS) + C\_SwEngState,$$

the combustion engine stays turned on, and if:

$$C\_Eng\_on > n(C\_ESS) + C\_SwEngState,$$

the combustion engine is turned off.

As long as the assessment performed by the first vehicle switch assessment operation 1-VEA determines that the combustion engine should be running the first vehicle status determination operation 1-VSD, followed by the first vehicle switch assessment operation 1-VEA, will be repeated according to the sample frequency S3.

If the assessment performed by the first vehicle switch assessment operation 1-VEA determines that the combustion engine should be turned off the combustion engine will be turned off accordingly.

Applying the assessment performed by the first vehicle status determination operation 1-VSD operation and the first vehicle switch assessment operation 1-VEA has the advantage that the combustion engine only will be turned off if this is preferable from a total cost perspective. Further, according to the inventive concept, if the combustion engine has been turned off a second vehicle status determination operation 2-VSD subsequently is applied. In accordance with the first vehicle status determination operation 1-VSD, in the second vehicle status determination operation 2-VSD a determination of the predicted cost for running the engine C_Eng_on, calculated as the cost the combustion engine would generate if the combustion engine still was running, and the momentary cost n(C_ESS) for the energy momentarily consumed in the number n of energy subsystem is executed. The cost for running the engine C_Eng_on and the momentary cost n(C_ESS) are subsequently fed to a second vehicle switch assessment operation 2-VEA, wherein if:

$$C\_Eng\_on \geq n(C\_ESS),$$

the combustion engine stays turned off, and if:

$$C\_Eng\_on < n(C\_ESS),$$

the combustion engine is turned on.

Hence, the evaluation of the momentary state and the predicted state is actually independent on which state that is the state where the combustion engine is turned on and in which state the combustion engine is turned on. What differs between the different states is that the cost for switching state, which according to the embodiment where the switching implies turning on or off a combustion engine, is that at one switch a switch cost is added. According to the embodiment with the combustion engine this switch cost is the cost associated with utilizing a starter engine for starting the combustion engine, but in other embodiments this switch cost may be other costs associated with a switch of state such as wear caused by changing gear. The switch cost can be added as a cost either to the switch of state where the cost actually is generated or as a cost when a switch of state is performed that eventually will generate a cost when switching back. In the embodiment shown in FIG. 7 the latter of these two approaches are chosen.

As long as the assessment performed by the second vehicle switch assessment operation 2-VEA determines that the combustion engine should stay turned off the second vehicle status determination operation 2-VSD, followed by the second vehicle switch assessment operation 2-VEA, will be repeated according to the sample frequency S3.

If the evaluation performed by the second vehicle switch assessment operation 2-VEA determines that the combustion engine should be started the combustion engine will be turned on accordingly. By starting the combustion engine of the vehicle the vehicle will be set to take off TO such that the vehicle instantly can respond to request for acceleration by the driver.

If the combustion engine is started the method steps according to the first vehicle status determination operation 1-VSD operation and the first vehicle switch assessment operation 1-VEA will be repeated according to the sample frequency S3. However, since the cost for switching state of the vehicle C_SwEngState comprises a time dependent parameter that, according to what has been previously described, makes the cost for switching state of the vehicle C_SwEngState increase over time it is not that likely, if not the conditions for the energy systems as a whole has changed drastically, that the combustion engine is turned off one more time. The later the combustion engine is turned back on, the less prone will the start-stop functionality of the inventive concept be to turn off the engine again.

It is also possible that the driver, when the combustion engine of the vehicle has been turned off, requests acceleration AR. If this occurs the start-stop functionality of the inventive concept is instantly over ruled and the combustion engine is started instantly such that the vehicle is set to take off TO.

With the aforementioned description in mind, and by referring to the embodiment of the energy system ES_3 disclosed in FIG. 6, the general method for determining if a switch from a momentary state of the vehicle to a predicted state of the vehicle should be executed will be applied for the energy system ES_3 as disclosed in FIG. 6. In the embodiment of FIG. 6, the momentary state is a state where a combustion engine is turned on and the predicted state is a state where the combustion engine is turned off. Thus, switching state of the vehicle implies turning off or on the combustion engine.

The embodiment of the energy system ES_3 of FIG. 6 comprises a mechanical energy subsystem Me_2, an electrical energy subsystem El_3 and a thermal energy subsystem Th_4. The mechanical energy subsystem Me_2 can provide energy to the electrical energy subsystem El_3 via the first converter Conv_6 and to the thermal energy subsystem Th_4 via the third converter Conv_8.

Thus, by applying the assessment criteria of the inventive concept as previously disclosed together with the description of FIG. 7 for the embodiment of the energy system ES_3 of FIG. 6 the following equations can be set up:

$$C\_Eng\_on = fuel\_rate(Q\_Eng\_on) \ [g/s],$$

giving momentary cost for keeping the engine running.

n(C_ESS) for an electrical energy subsystem El_3 and a thermal energy subsystem Th_4, hence n=2, gives:

$$C\_El = p\_El\_engine\_off * Q\_ConvEl \ [g/s], \ \text{and}$$

$$C\_Th = p\_Th\_engine\_off * Q\_ConvTh \ [g/s],$$

where CLConvEl and Q_ConvTh is the quantity of mechanical energy converted by a converter of respective energy subsystem El_3; Th_4 to energy of the energy form of respective energy subsystem El_3; Th_4 when the combustion engine is running. E.g. for the electrical energy subsystem El_3 may this be the quantity of mechanical power converted to electrical energy by an alternator. Hence, C_El and C_Th can be seen as the value or cost for electrical power needed and thermal power needed when the combustion engine is turned off. The cost for switching state of the vehicle is determined according to:

$$C\_SwEngState = Q\_starter\_engine * t\_start\_engine * \\ (p\_el\_engine\_off / t\_pred\_engine\_off) \ [g/s],$$

wherein if $$C\_Eng\_on \leq C\_El + C\_th + C\_SwEngState,$$

the combustion engine stays turned on, and if:

$$C\_Eng\_on > C\_El + C\_Th + C\_SwEngState,$$

the combustion engine is turned off.

Q_Eng_on, Q_El and Q_Th can preferably be obtained by using the previously described Marshall Equilibrium Theory, but the inventive concept for managing the switching between at least two discrete states also applies if Q_Eng_on, Q_El and Q_Th are obtained by other means.

When the combustion engine has been turned off, according to the inventive concept the following assessment continuously is executed, wherein if:

$$C\_Eng\_on \geq C\_El + C\_Th,$$

the combustion engine stays turned off, and if:

$$C\_Eng\_on < C\_El + C\_Th,$$

the combustion engine is turned back on.

Figure 8:
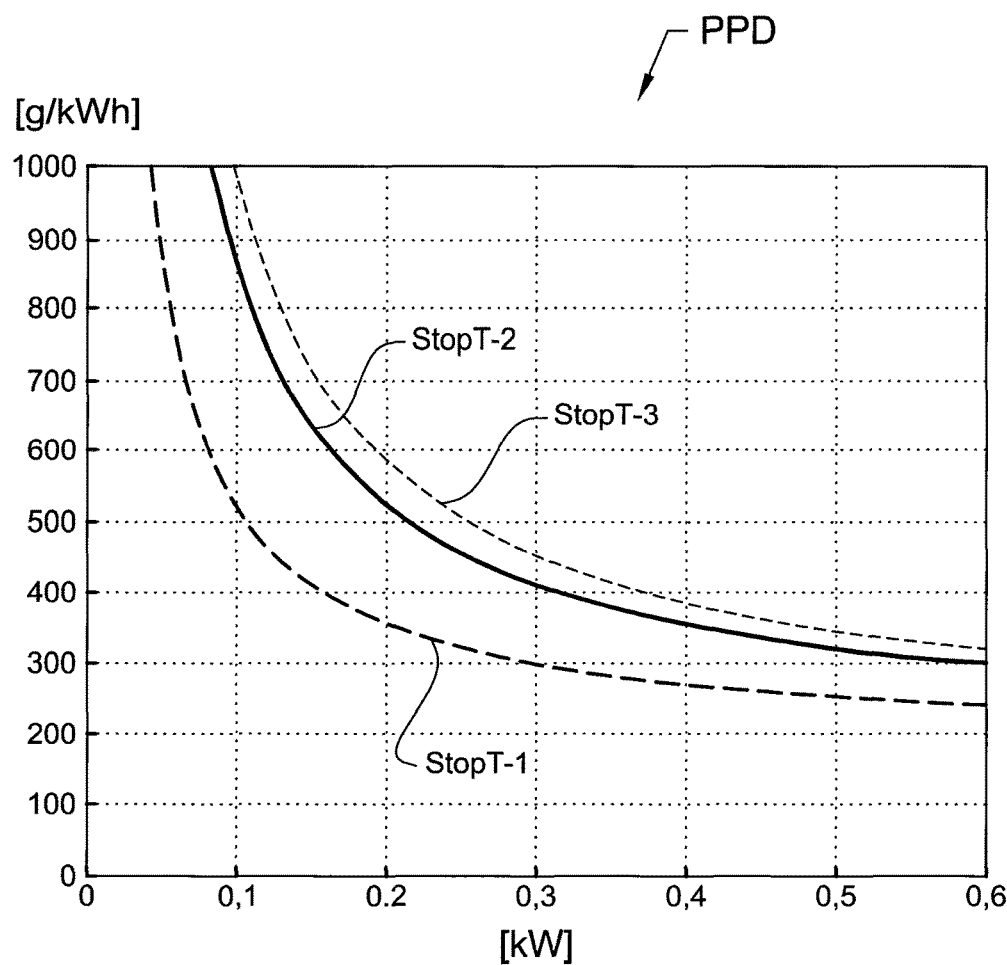
FIG. 8 shows a diagram according to one embodiment of the inventive concept showing the relation between the costs for keeping the engine on versus useful power outtake at three predicted vehicle stop times.

Referring now to FIG. 8, disclosing a function according to one embodiment of the inventive concept showing the relation between the cost, specified in g/kWh, for keeping the engine on versus useful power outtake, specified in kW, at three predicted vehicle stop times. The cost for keeping the engine on is indicated on the Y-axis and the useful power outtake is indicated on the x-axis.

As has been previously described, the cost for switching state of the vehicle C_SwEngState comprises the remaining predicted time until vehicle take off. This parameter can be determined in various ways such as using different calculation methods, setting a predetermined value dependent on e.g. type of vehicle or predicted route or can be based on statistical information. It may also be possible to provide the ECU with such information from a traffic light using e.g. WiFi or BlueTooth.

FIG. 8 shows a power outtake vs. price to keep the engine on diagram PPD for an embodiment of the inventive concept where the power-price function of a first, a second and a third predicted remaining stop time are shown StopT-1; StopT-2; StopT-3. In the embodiment shown the first predicted remaining stop time StopT-1 represent a predicted remaining stop time of 5 seconds, the second predicted remaining stop time StopT-2 represent a predicted remaining stop time of 15 seconds and the third predicted remaining stop time StopT-3 represent a predicted remaining stop time of 60 seconds.

As is shown in FIG. 8, the longer the predicted time to vehicle take off is, the higher will the price for keeping the engine on be. This is reasonable since the longer time it is predicted that the vehicle will stand still, the more likely it is that the mechanical power generated by the combustion engine when running cannot be fully utilized. Correspondingly, the shorter the predicted time to vehicle take off is, the lower will the price to keep the engine on be during vehicle stand still.

If the combustion engine is turned off the combustion engine will be started by using a starter engine, preferably provided with electrical power from a battery. As previously disclosed, according to the inventive concept the cost for switching state of the vehicle is added as a cost when calculating the cost for the predicted state. Hence, independently of between which states the inventive concept is intended to control the switch, there will be an inherent resistance to switching state from the momentary state to the predicted state.

Also, according to one embodiment of the inventive concept the cost for switching state of the vehicle is time dependent in that the switch cost is divided by the predicted remaining time to vehicle take off. This means that the shorter the predicted remaining time to vehicle take off is, the more influential will the cost for switching state of the vehicle be. This implies that the shorter the predicted remaining time is, the less prone will the inventive concept be to initiate a switch.

These two aspects of the inventive concept will counteract too frequently occurring switches. In an embodiment where the combustion engine provided with start-stop functionality this will show in that the cost for starting the combustion engine, after the engine has been turned off, an additional cost is added when turning the engine off instead of when turning the engine on. This has the advantage that the inventive concept will be less prone to switch state of the vehicle, in this embodiment showing as that the combustion engine will be less prone to be turned off.

The lower the requested power outtake is, the higher will the price for keeping the engine on be. As the requested power outtake approaches zero the price for keeping the engine on will approach infinity. Thus, if only a very limited amount of power is requested from the combustion engine by a converter of an energy subsystem, in order to provide a consumer of said energy subsystem with that limited amount of power, it will be costly to keep the combustion engine running just for providing this limited amount of power, and it will be likely that e.g. an energy buffer of respective energy subsystem, if one is present, or another energy subsystem can provide power to a lower cost.

Figure 9:
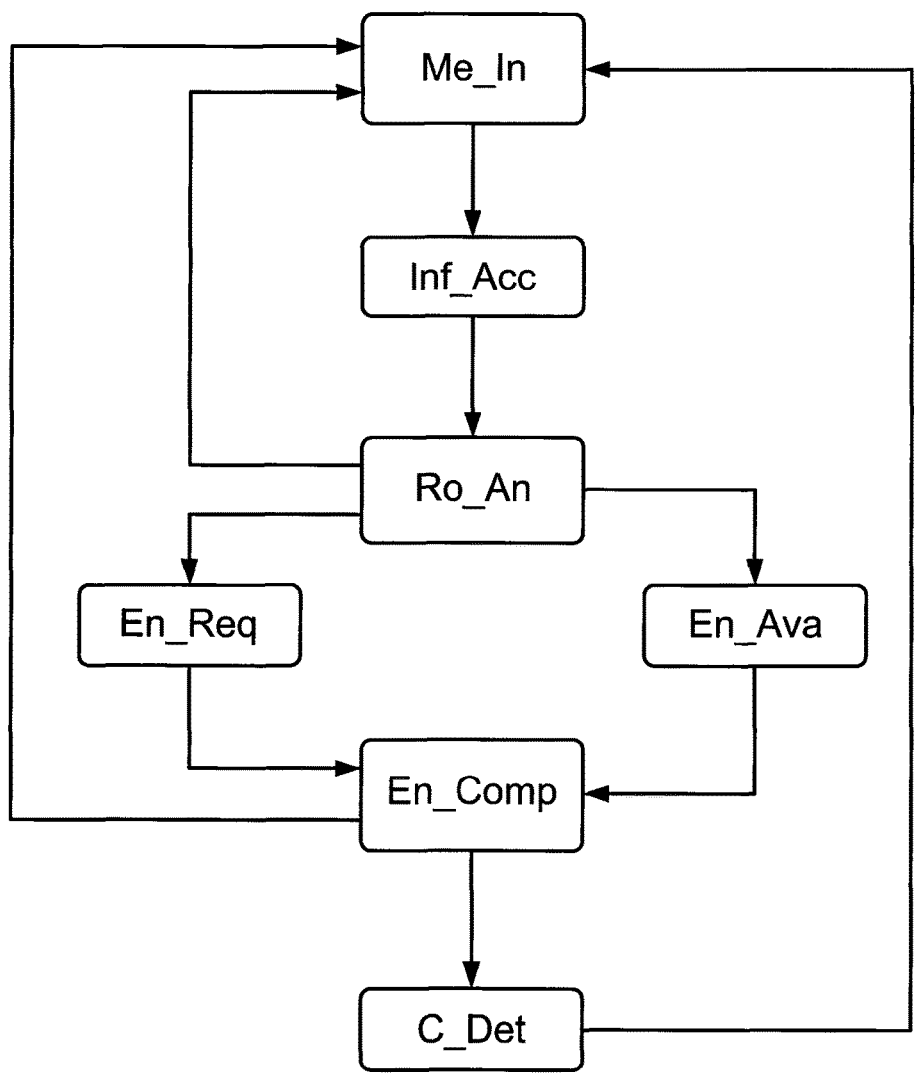
FIG. 9 shows a schematic flowchart of yet another embodiment of the inventive concept.

Referring now to FIG. 9 disclosing a schematic flowchart of an embodiment of the inventive concept controlling gear selection in order to avoid downshifting. The embodiment of the inventive concept is executed for a vehicle comprising an energy system, and wherein a mechanical energy subsystem of said energy system comprises a combustion engine.

According to the inventive concept an ECU (Engine Control Unit) or like continuously executes the inventive concept Mejn. During method execution information regarding upcoming travel route for a predetermined time horizon is continuously accessed Inf_Acc. The information regarding upcoming travel route provided is subsequently analyzed Ro_An such that it can be determined if said travel route comprises an uphill slope.

If no such uphill slope is detected the method of accessing information regarding upcoming travel route is repeated next time the method is executed Mejn.

If an upcoming uphill slope is detected the power required from the combustion engine for driving up said uphill slope is determined En_Req. Also a maximal available power, when driving in current gear and with current auxiliary loads, for climbing said uphill slope is determined En_Ava.

Said determined power required for driving up said uphill slope En_Req and said determined maximal available power En_Ava are compared En_Comp in order to determine the amount if power available for vehicle propulsion is sufficient for driving up said uphill slope.

If so, the methods of accessing information regarding upcoming travel route is repeated next time the method is executed Mejn.

If it is concluded that the power available is insufficient for driving up said uphill slope without changing gear a penalty cost for selecting a reduced gear is determined. As mentioned above the amount of the penalty cost is determined C_Det in dependence of length and/or the steepness of the uphill slope. Said penalty cost is subsequently added to the unitary energy price of the mechanical energy, resulting in a substantially higher unitary energy price for mechanical energy next time the inventive concept for managing energy flows within an energy system of a vehicle according to what previously has been disclosed is executed Mejn. By increasing the unitary energy price for mechanical energy from the mechanical energy subsystem, wherein the mechanical energy subsystem comprising the combustion engine is the main energy source, the distribution of energy and energy flows within said energy system will automatically change accordingly.

According to the inventive concept, by manipulating the unitary energy price for mechanical energy the utilization of mechanical energy can be affected such that more mechanical power will be available for propulsion of the vehicle.

Figure 10:
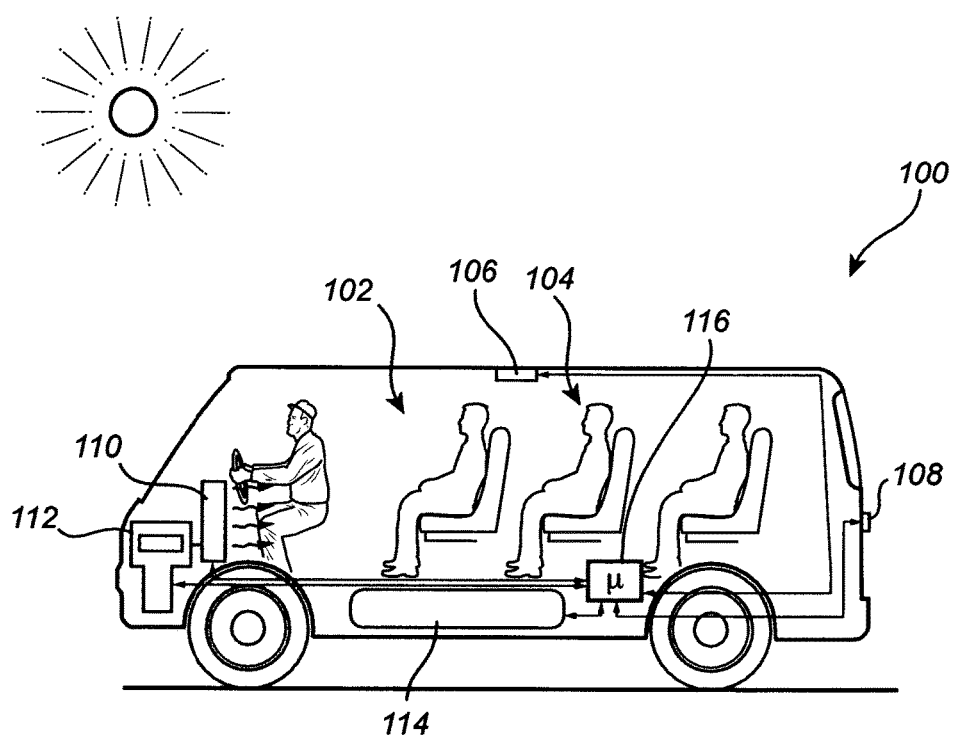
FIG. 10 illustrates a bus making use of the inventive concept.

With further reference to FIG. 10 there is provided a vehicle, illustrated as a bus 100. The bus 100 comprises a first energy buffer, in the illustrated embodiment provided as a passenger compartment 102 for transporting a plurality of persons 104, etc. A temperature sensor 106 is arranged inside of the passenger compartment 102 for sampling the temperature inside of the passenger compartment 102. An outdoor temperature sensor 108 may also be provided for sampling a temperature outside of the bus 100. The bus 100 is additionally provided with a mechanical air conditioning unit 110 configured for adjusting the temperature inside of the passenger compartment 102. The mechanical air conditioning unit 110 is operationally connected to a driveline/internal combustion engine (ICE) 112. The mechanical air conditioning unit 110 and driveline/ICE 112 collectively forms a power converter. The driveline/ICE 112 is also configured for propelling the bus 100.

Furthermore, the bus 100 is provided with a second energy buffer, in the illustrated embodiment provided as a fuel tank 114 operatively connected to the ICE 110. Still further, the bus 100 is provided with a vehicle system controller 116, typically comprising computational functionality, for example including a microprocessor, the ECU, etc. The vehicle system controller 116 is connected to the temperature sensors 106, 108, the air conditioning unit 110, the ICE 112 and the fuel tank 114 (e.g. for determining the quantity of fuel in the fuel tank 116) and configured to control the operation of e.g. the air conditioning unit 110 and the ICE 112.

As mentioned above, the passenger compartment 102 forms a first energy buffer where an energy level can increase or decrease based on the operation of the bus 100. Put in relation to the present embodiment, the temperature inside of the passenger compartment 102 can increase or decrease during operation of the bus 100, typically based on the temperature outside of the passenger compartment 102, the persons 104 inside of the passenger compartment 102 and based on the operation of the air conditioning unit 110. In a warm environment, the temperature outside of the passenger compartment 102 will typically increase the temperature inside of the passenger compartment 102, and the air conditioning unit 110 will decrease the temperature inside of the passenger compartment 102. The operation of the mechanical air conditioning unit 110 will require energy, in the present embodiment based on energy acquired from the driveline/ICE 112.

The energy being available at the driveline/ICE 112 is converted from e.g. fuel stored in the second energy buffer, i.e. the fuel tank 114 (e.g. holding gasoline or diesel). Similarly as discussed above, an energy level for the second energy buffer can increase or decrease based on the operation of the bus 100. In regards to the ICE 112, the energy level for the fuel tank 114 will normally decrease during operation of the bus 100. However, the second buffer could also be implemented as an electrical storage means, e.g. as a battery, super capacitor, etc., where the energy level can increase or decrease during operation of the bus 100. For example, the bus 100 may be a hybrid bus configured for regeneration of energy (e.g. when travelling downhill), where the regenerated energy may be stored in the second buffer. The second buffer could also be configured for storing mechanical energy, e.g. as a fly wheel.

During operation of the bus 100, the vehicle system controller 116 determines the temperature inside and outside of the passenger compartment 102 using the temperature sensors 106, 108, respectively. In regards to a normal implementation, the temperature within the passenger compartment 102 is allowed to fluctuate within a predetermined temperature range, e.g. between 18-23 degrees C. In the present implementation, the vehicle system controller 116 will determine a current buffer ratio for the passenger compartment 102. The current buffer ratio for the passenger compartment 102 is based on where within the predetermined temperature range the inside temperature is determined to be (i.e. based on data from the temperature sensor 106).

Once the current buffer ratio for the passenger compartment 102 is determined, it is possible to determine if the current buffer ratio for the passenger compartment 102 should be increased, that is if the temperature within the passenger compartment 102 should be decreased. This determination is based on the current buffer ratio for the passenger compartment 102 and a cost for generating energy from energy stored in the second energy buffer using the power converter. Put in context with the present embodiment, the cost will be based on the process of converting energy stored in the fuel tank 114 using the driveline/ICE 112 and the mechanical air conditioning unit 110 for cooling the passenger compartment 102.

The cost for generating energy from fuel stored in the fuel tank 114 will typically be further based on an efficiency of the power converter and a valuation of the energy stored in the second energy buffer. In the present embodiment, the efficiency will be based on the total efficiency of the driveline/ICE 112 and the mechanical air conditioning unit 110. The valuation of the energy stored in the second energy buffer will accordingly be based on the fuel cost (e.g. per unit).

In the present embodiment, a further valuation is made in regards to the energy stored in the passenger compartment 102. It will thereby be possible to find a relation between the valuation of the fuel stored in the fuel tank 114 and the valuation of the temperature within the passenger compartment 102. Following this relation, it will in accordance to the present embodiment be possible to find an equilibrium between these valuations. That is, in case the cost for lowering the temperature is to "high" the air conditioning unit will not be activated. As understood, there will be a "cost" for increasing the temperature within the passenger compartment 102 based on the temperature outside of the passenger compartment 102, where the cost will be higher when the temperature gets closer to the upper end of the temperature range. This cost will thus be compared to the cost for operating the air conditioning unit 110 for lowering the temperature inside of the passenger compartment 102.

Accordingly, it may be possible to differentiate the cost for e.g. mechanical energy dependent on the operation of the bus 100. In a simplified example where the bus 100 is travelling in a hilly terrain with a warm climate, the cost for mechanical energy may be seen as (in comparison) high when travelling uphill and (in comparison) low when travelling downhill. As such, the efficiency for the power converter may be seen as being more efficient when travelling downhill as compared when travelling uphill. Specifically, the amount of fuel needed for cooling the passenger compartment 102 when travelling downhill will be less as compared when travelling uphill.

The cost for operating the air conditioning unit will typically be lower when travelling downhill than when travelling uphill. When seen from a fixed temperature inside the passenger compartment 102 this may result in that the air conditioning unit 110 is operated when travelling downhill but not when travelling uphill. Accordingly, it may be advantageous to provide the first energy buffer (i.e. the passenger compartment 102) with energy when travelling downhill (low cost) as compared when travelling uphill.

The above is one example of implementing the inventive concept. As discussed above, it may be possible to allow other vehicle components to function as a buffer, e.g. a battery, a capacitor or a flywheel. Accordingly, the above discussion is equally relevant in case the first energy buffer is e.g. a battery (instead of being the passenger compartment 102). In addition, it may be possible to apply the inventive concept in relation to a "multi step implementation", i.e. where more than a first and a second energy buffer are provided.

For example, the first buffer may be a battery and an electrically powered air conditioning unit may additionally be connected to the battery. As such, the inventive concept may in a first step be applied in relation to mechanical energy for "charging" the battery, and in a second step for providing energy from the battery to the electrically powered air conditioning unit. That is, a cost relation will thereby be found between the ICE 112 and a generator (not shown) for converting fuel stored in the fuel tank 114 to electrical energy used for charging the battery. In this example the battery will function as the first energy buffer, the ICE 112 and the generator will function as the power converter, and the fuel tank 114 will function as the second energy buffer. In the second step, the passenger compartment 102 will function as the first buffer, the electrically powered air conditioning unit will function as the power converter and the battery will function as the second buffer—all in accordance to the inventive concept.

It should be noted that it optionally may be possible to further include information relating to the topography of the road onto which the vehicle is travelling. Such information can for example include information relating to upcoming uphill or downhill sections, etc., sometimes referred to as an eHorizon for the vehicle. As such, the topography/eHorizon can in accordance to the invention be included in the determination if the current buffer ratio for the first energy buffer should be increased using energy provided by the power converter. In relation to e.g. the example where the vehicle comprises an air conditioning unit (mechanically and/or electrically powered), this may result in a determination by the vehicle system controller where the air conditioning unit is activated in the downhill section rather than in the uphill section. That is, as the vehicle has information in regards to an upcoming downhill section it may be advantageous (from a cost perspective) to wait until the downhill section. Accordingly, it could in a possible embodiment of the invention be preferred to allow the predetermined buffer range for the first energy buffer to be dynamic. This could in the above example result in that the temperature may be allowed to pass the upper range (e.g. above 23 degrees C.) for a short period, as the cost for lowering the temperature will be in comparison lower once at the downhill section.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed invention, from a study of the drawings, the disclosure, and the appended claims. The person skilled in the art realizes that the present invention is not limited to the preferred embodiments.

The invention claimed is:

1. A vehicle, the vehicle comprising:
   a first energy buffer, the first energy buffer having a buffer energy level that can Increase or decrease based on the operation of the vehicle;
   a second energy buffer, the second energy buffer having a buffer energy level that can increase or decrease based on the operation of the vehicle;
   a power converter operationally connected to the first and the second energy buffer, and
   a vehicle system controller, the vehicle system controller being configured to:
   determine a current buffer ratio for the first energy buffer based on a current buffer energy level for the first energy buffer and a predetermined buffer range for the first energy buffer, and
   determine If the current buffer ratio for the first energy buffer should be increased using energy provided by the power converter from energy stored In the second energy buffer, the determination being based on the current buffer ratio for the first energy buffer and a cost for generating energy from energy stored in the second energy buffer using the power converter.

2. Vehicle according to claim 1, wherein the cost for generating energy from energy stored in the second energy buffer using the power converter Is based on an efficiency of the power converter and a valuation of the energy stored In the second energy buffer.

3. Vehicle according to claim 1, wherein determining If the current buffer ratio for the first energy buffer should be increased is further based on a comparison between a current valuation of energy stored In the first energy buffer and the cost for generating energy from energy stored In the second energy buffer using the power converter.

4. Vehicle according to claim 1, wherein the power converter comprises at least one of a generator comprised with the vehicle and a combination of an engine and the generator comprised with the vehicle.

5. Vehicle according to claim 4, wherein the engine is a combustion engine.

6. Vehicle according to claim 5, wherein the combustion engine is comprised with a driveline for propelling the vehicle.

7. Vehicle according to claim 1, wherein the first buffer comprises at least one of a battery, a capacitor, a heat storage device such as a passenger compartment, or a flywheel.

8. Vehicle according to claim 1, wherein the second buffer comprises at least one of a battery and a fuel tank.

9. Vehicle according to claim 3, wherein the power converter comprises an air conditioning unit (110) and the first buffer Is a passenger compartment.

10. Vehicle according to claim 1, wherein determining If the current buffer ratio for the first energy buffer should be Increased is further based on topographic Information relating to the present and future operation of the vehicle.

11. Vehicle according to claim 3, wherein the power converter Is an electrically powered air conditioning unit, the first buffer being an enclosed passenger compartment having an Inside temperature at least partly adjusted during operation of the air conditioning unit, and the second buffer being an electrical energy storage such as a battery.

12. A computer readable medium storing a program for implementing power distribution management in a vehicle system controller comprised with a vehicle as claimed in claim 1.

* * * * *